US008523221B2

(12) United States Patent
Müller

(10) Patent No.: US 8,523,221 B2
(45) Date of Patent: Sep. 3, 2013

(54) AIRBAG MODULE AND SEAT RELATED THERETO, AND ALSO MANUFACTURING APPARATUS AND ASSEMBLY METHOD THEREFOR

(75) Inventors: Helmut Müller, Rüsselsheim (DE); Ursula Müller, legal representative, Rüsselsheim (DE)

(73) Assignee: Faurecia Autositze GmbH, Stadthagen (DE)

( * ) Notice: Subject to any disclaimer, the term of this patent is extended or adjusted under 35 U.S.C. 154(b) by 80 days.

(21) Appl. No.: 13/003,827

(22) PCT Filed: Jul. 10, 2009

(86) PCT No.: PCT/DE2009/000976
§ 371 (c)(1),
(2), (4) Date: Sep. 23, 2011

(87) PCT Pub. No.: WO2010/003407
PCT Pub. Date: Jan. 14, 2010

(65) Prior Publication Data
US 2012/0038131 A1    Feb. 16, 2012

(30) Foreign Application Priority Data

| Jul. 10, 2008 | (DE) | 20 2008 009 238 U |
| Aug. 21, 2008 | (DE) | 20 2008 011 106 U |
| Nov. 28, 2008 | (DE) | 20 2008 015 836 U |
| Mar. 10, 2009 | (DE) | 20 2009 003 420 U |

(51) Int. Cl.
*B60R 21/207*    (2006.01)

(52) U.S. Cl.
USPC ............................. 280/730.2; 280/743.2

(58) Field of Classification Search
CPC    B60R 21/201; B60R 21/207; B60R 21/2338; B60R 2021/2076
USPC .............. 280/728.2, 730.2, 743.1, 743.2
See application file for complete search history.

(56) References Cited

U.S. PATENT DOCUMENTS 5,222,932 A * 6/1993 Fontecchio ............... 493/210
5,685,347 A * 11/1997 Graham et al. ............ 139/390
(Continued)

FOREIGN PATENT DOCUMENTS

DE    19860840 A1    9/1999
DE    10307480 A1    9/2004
(Continued)

OTHER PUBLICATIONS

International Search Report published Jan. 14, 2010 for PCT/DE2009/000976 filed Jul. 10, 2009.
(Continued)

*Primary Examiner* — Joseph Rocca
(74) *Attorney, Agent, or Firm* — Fleit Gibbons Gutman Bongini & Bianco PL; Martin Fleit; Paul D. Bianco

(57) ABSTRACT

The invention relates to an airbag module (18) with a tear strip (13) for specific opening of a seat cover (20) under which the airbag module (18) is to be mounted, wherein a plurality of tear strips (13) is provided. Furthermore, the invention relates to a seat with one such airbag module and also to a manufacturing apparatus and to an assembly method for one such airbag module.

43 Claims, 27 Drawing Sheets

(56) References Cited

U.S. PATENT DOCUMENTS

| | | | |
|---|---|---|---|
| 5,765,867 A * | 6/1998 | French | 280/743.2 |
| 5,810,389 A | 9/1998 | Yamaji et al. | |
| 5,865,464 A * | 2/1999 | Kanuma et al. | 280/743.1 |
| 5,884,574 A * | 3/1999 | Sogi et al. | 112/441 |
| 5,979,979 A * | 11/1999 | Guerinot et al. | 297/216.13 |
| 6,299,197 B1 | 10/2001 | Müller | |
| 7,125,037 B2 * | 10/2006 | Tallerico et al. | 280/728.2 |
| 7,695,004 B2 | 4/2010 | Inoue | |
| 7,712,772 B2 | 5/2010 | Müller | |
| 7,784,819 B2 * | 8/2010 | Lawall et al. | 280/728.3 |
| 7,954,842 B2 * | 6/2011 | Deppe et al. | 280/728.3 |
| 8,220,832 B2 * | 7/2012 | Muller | 280/730.2 |
| 8,251,396 B2 * | 8/2012 | Zothke et al. | 280/728.2 |
| 2004/0239081 A1 * | 12/2004 | Tredez | 280/728.2 |
| 2005/0116446 A1 * | 6/2005 | Mabuchi et al. | 280/728.2 |
| 2005/0161917 A1 * | 7/2005 | Stevens | 280/730.2 |
| 2007/0164545 A1 | 7/2007 | Müller | |
| 2007/0273129 A1 | 11/2007 | Inoue | |
| 2008/0217892 A1 * | 9/2008 | Maripudi et al. | 280/740 |
| 2008/0257252 A1 * | 10/2008 | Kobetz | 116/28 R |
| 2008/0258440 A1 | 10/2008 | Müller | |
| 2009/0051148 A1 * | 2/2009 | Osterhout | 280/728.3 |
| 2010/0013199 A1 | 1/2010 | Müller | |

FOREIGN PATENT DOCUMENTS

| | | |
|---|---|---|
| DE | 102007000291 A1 | 11/2007 |
| EP | 0782944 A1 | 7/1997 |
| WO | 2005/102789 A2 | 11/2005 |
| WO | WO 2006027166 A1 * | 3/2006 |
| WO | 2007/042011 A2 | 4/2007 |
| WO | 2008095485 A1 | 8/2008 |

OTHER PUBLICATIONS

International Preliminary Report on Patentability published Jan. 11, 2010 for PCT/DE2009/000976 filed Jul. 10, 2009.

Written Opinion of the International Search Authority published Jan. 10, 2010 for PCT/DE2009/000976 filed Jul. 10, 2009.

* cited by examiner 67 56 57

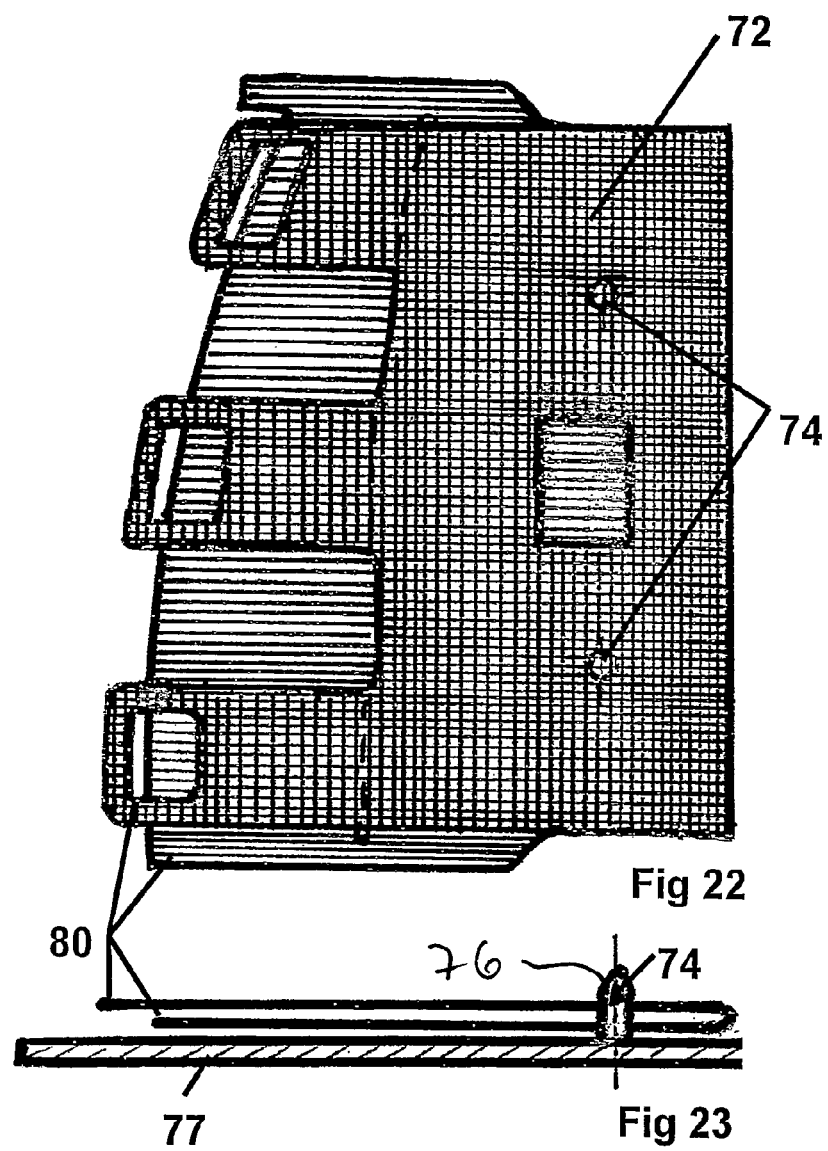

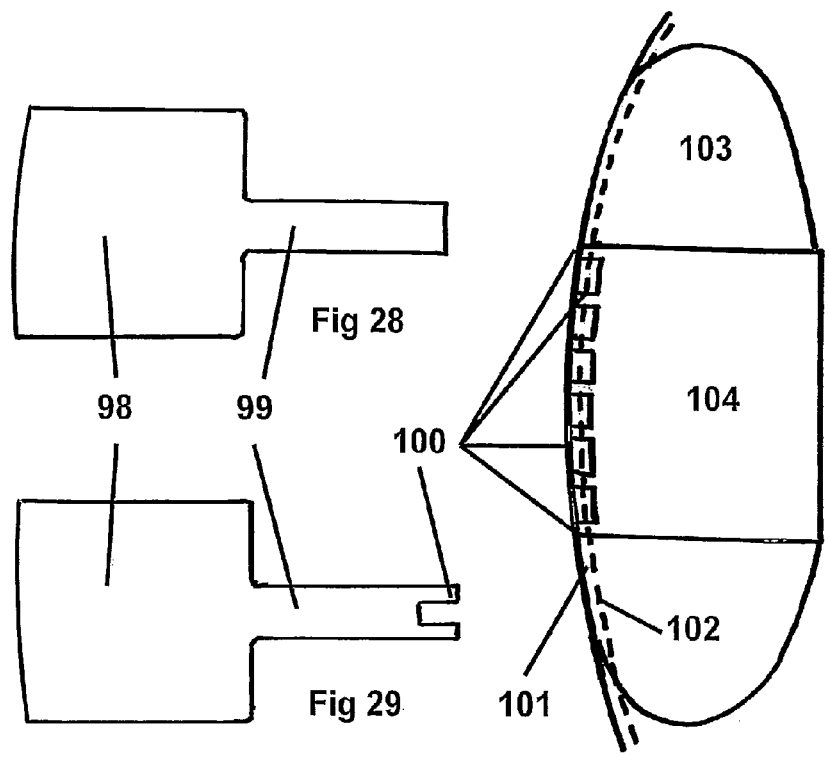
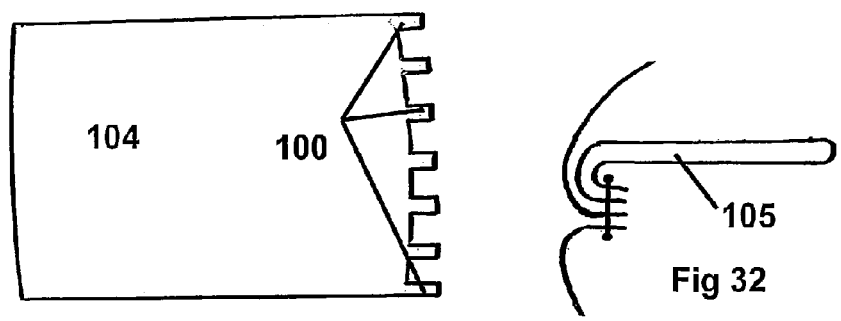

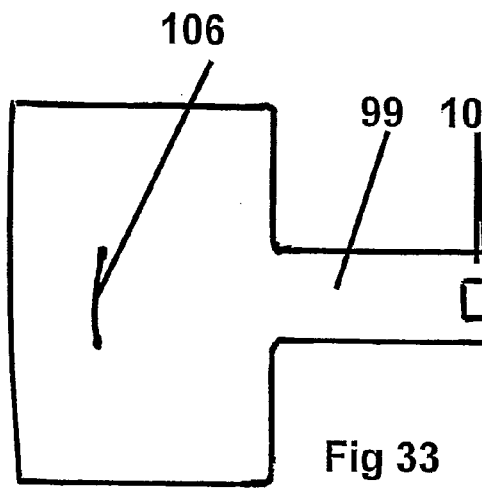
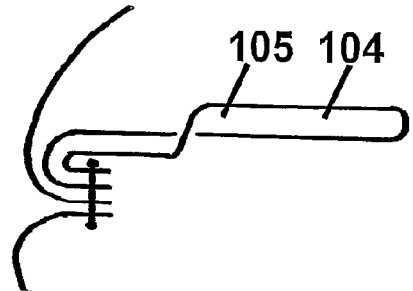
Fig 33                Fig 34
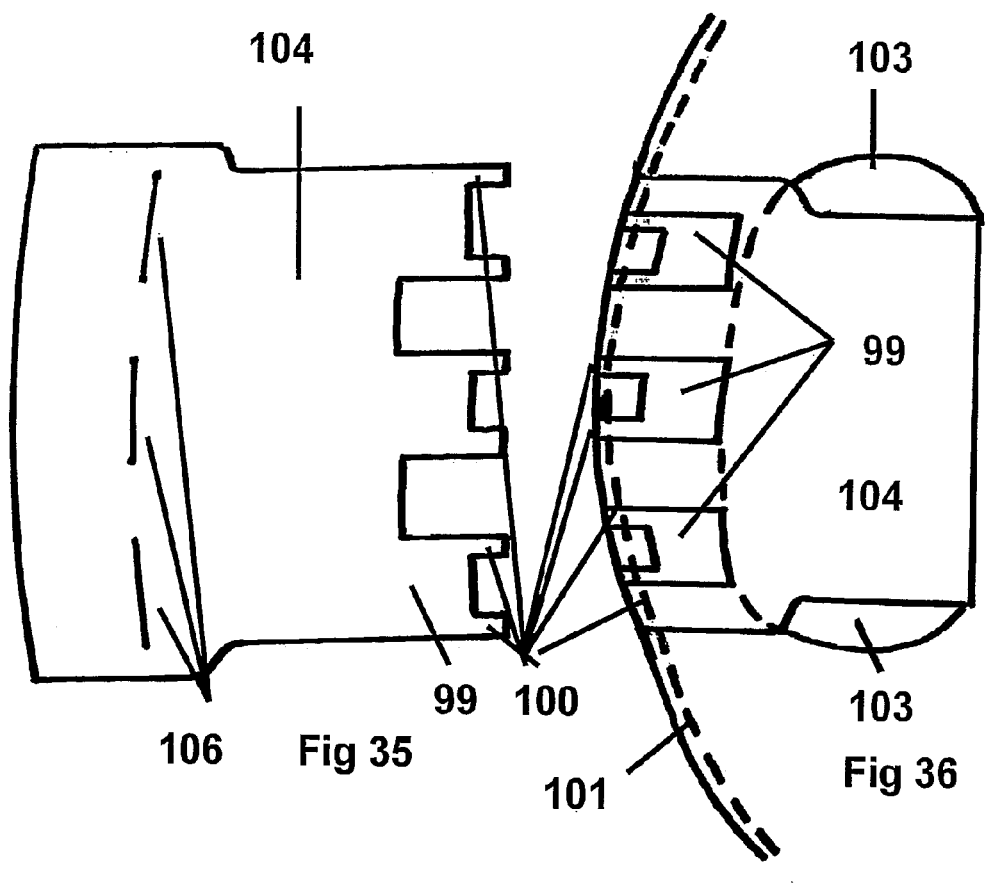
Fig 35                Fig 36

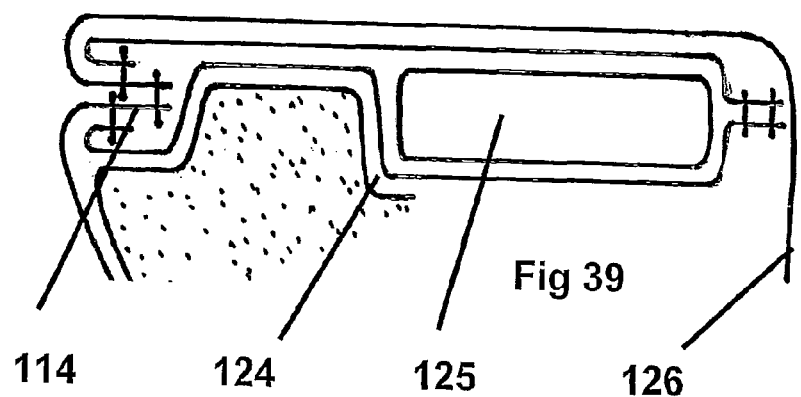
114   124   125   Fig 39   126
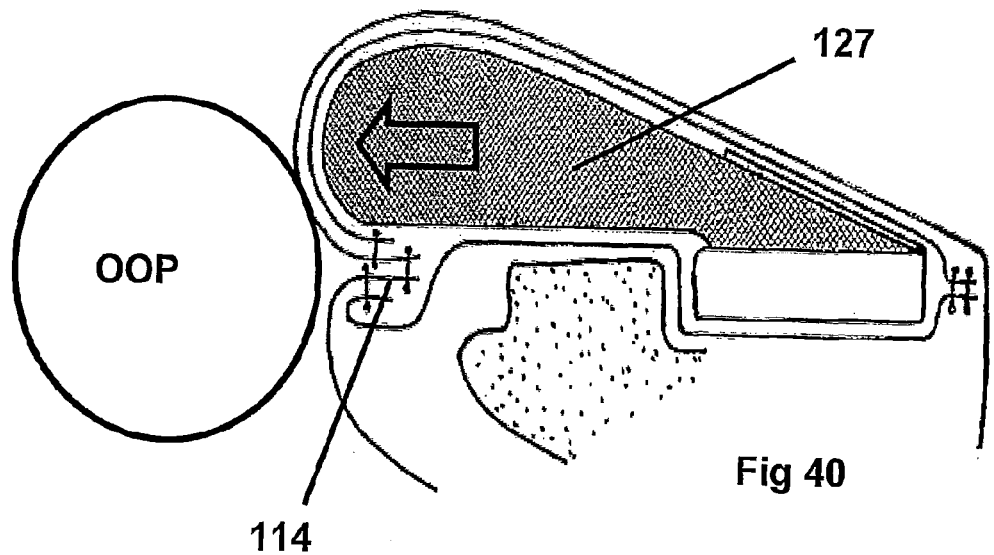
OOP
127
Fig 40
114

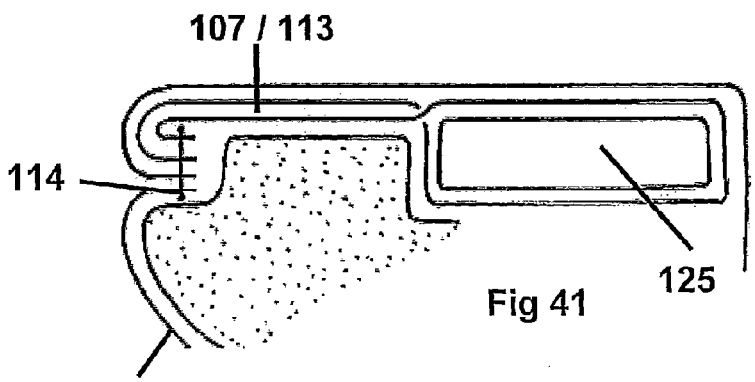
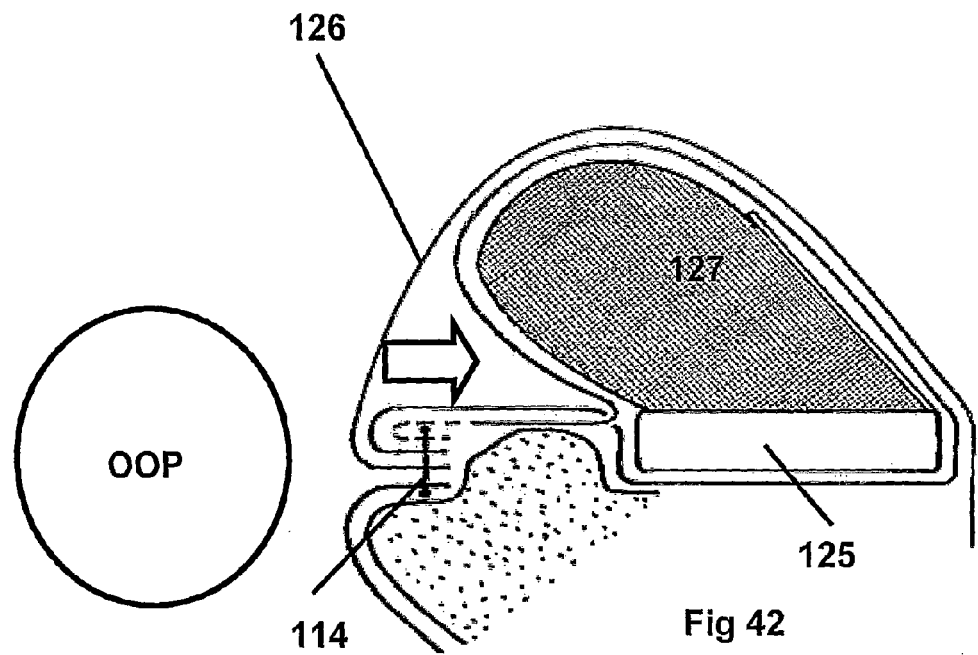

AIRBAG MODULE AND SEAT RELATED THERETO, AND ALSO MANUFACTURING APPARATUS AND ASSEMBLY METHOD THEREFOR

FIELD OF THE INVENTION

The invention relates to an airbag module, a seat with such an airbag module, and also a manufacturing apparatus and an assembly method for such an airbag module.

CROSS REFERENCE TO RELATED APPLICATIONS

The application DE 19860840 A1 published at an earlier date and referring to the present applicant and the parallel U.S. Pat. No. 6,299,197, as well as the PCT Applications WO 2005/102789 A1 and WO 2007/042011 A2 relate to airbag modules and their assembly methods each under a seat cover with a tear strip, in order to open the seat cover like a run in fabric with a tear strip, so that the airbag of the airbag module can be ejected easily, simply, and in a defined way and thus can exert its protective effect in an optimal way. The contents of disclosure of all of these previously published intellectual-rights applications are herewith incorporated through reference to their full extent in the present documents for the avoidance of simple repetition, especially with respect to the constructions, arrangements, and assemblies, as well as functions of the tear strip.

SUMMARY OF THE INVENTION

The present invention has and achieves the goal of further improving the tear-strip technology. The individual solutions according to the invention are specified in the accompanying, independent claims.

Thus, the invention creates an airbag module with a tear strip for the targeted opening of a seat cover under which the airbag module is to be mounted, wherein a plurality of tear strips is provided.

Here it is preferred when a fabric web is further contained and constructed such that an arbitrary number of tear strips are included or produced and/or the tear strip and the force for opening the fabric run are balanced. Alternatively, it is preferred when a fabric web is included and constructed such that several, advantageously at least two tear strips are combined into one wide strip.

Furthermore, it can be advantageously provided that a fabric web is included and constructed such that it contains wide strips that allow, together with their intermediate spaces, an interlacing of additional fabric webs.

It is further preferred when a tear-strip width and a stitch length are adjusted such that, on one hand, for each tear strip a few stitches, especially only one stitch, is/are severed and, on the other hand, the stitches are not set next to the tear strip, wherein especially the tear-strip width equals approximately 6 mm and the stitch length equals 4 mm to 5 mm.

The invention also creates a seat that is characterized in that an airbag module according to one of the preceding claims is contained.

Furthermore, the invention creates an assembly method for an airbag module, wherein an airbag module with several tear strips for the targeted opening of a seat cover is mounted under the seat cover.

The invention also creates an airbag module with a tear strip collar, wherein the tear strip collar is cut such that the warp and/or woof threads come to lie each in the pulling direction of the tearing force controlled by the pre-cut part, so that no threads go out of place laterally.

Furthermore, the invention creates an airbag module with a tear strip collar, wherein the tear strip collar is constructed such that tear strips stand at a "right" angle to each other, i.e., the threads receiving the force (in a tear strip the woof threads and in the other strips the warp threads) take on the tearing force.

Even further, through the invention an airbag module with a tear strip collar is created, wherein the tear strip collar is constructed such that it can be used on the left and right seats without changes.

Furthermore, through the invention a manufacturing apparatus for a tear strip collar of an airbag module named above is created, wherein a "comb-like" plate is contained that simultaneously pushed all of the tear strips through their allocated slits with only one movement.

In another assembly method created by the invention for an airbag module, it is provided that a tear strip collar is created by cutting with a hot blade such that the ends of the narrow tear strips fuse as a measure against tearing out the threads at the end.

In another airbag module according to the invention, especially according to the previously mentioned constructions, it is provided that for better assembly, the small tear strips are connected to each other with a crosspiece as continuation of the wide tear strips such that it produced a stable unit in which the small tear strips are held exactly in position for hot fusing.

The latter variant can therefore be further constructed advantageously such that the tear strips are connected to each other with a crosspiece, so that this unit can be fit in a positioning sheet before the fusing process and/or the crosspiece is constructed such that this is then separated with the hot blade and the "small" tear strips are fired together into the predetermined position on the bottom side of the collar.

In another assembly method according to the invention for an airbag module, especially according to the previously mentioned constructions, it is provided that a process for firing the small tear strips together is constructed such that the sewer has a solid part for sewing close to the airbag seam and individual strips do not have to be positioned.

According to the apparatus and method, another preferred construction consists in that a hot-cutting process is used such that, apart from the adhesion of the small tear strips, their ends are also simultaneously fused, so that the threads do not tear out under loading, which leads to an improved comb shearing strength.

In yet another airbag module according to the invention, especially according to the previously named constructions, it is provided that the tear strip is constructed such that the designation AIRBAG is printed on its end, in order to save an extra "label" (FIGS. 15 and 16). In yet another airbag module according to the invention, especially according to the previously named constructions, it is provided that a tear-strip collar is provided with positioning holes such that the folded collar maintains its exact position in positioning pins for the process of the hot cutting (FIG. 17). In a different airbag module according to the invention, especially according to the previously named constructions, it is provided that a collar is constructed such that, at the beginning of the seam position, this is specified with a positioning vane. These variants can be further constructed advantageously such that a collar is positioned such that a "comb-like" plate pushes all of the tear strips simultaneously and thus in parallel through the specified slits (FIGS. 18-21). Yet another preferred construction in this context consists in that the manufacturing process is constructed such that the tear strips fall almost automatically into the positioning or holding plates as a precondition for an exact positioning of the tear strips for and after the fusing.

In yet another airbag module according to the invention, especially according to the previously named constructions, it is provided that a collar is positioned and provided at the fuse point with "counter holders" such that an appropriate fusing is carried out (FIGS. 22-25).

In another airbag module according to the invention, especially according to the previously named constructions, it is provided that an opening is constructed in the foam of the seatback for holding the airbag module such that, instead of the module packet, only the packet cover is placed in the foam, so that this cover seals the surface exactly (FIGS. 26-27). Advantageously, other constructions consist in that an integration of the module box cover is carried out such that it can open and close for assembly of the airbag and/or an airbag cover is constructed such that it is placed only after assembly of the airbag in the foam.

Yet another airbag module according to the invention, especially according to the previously named constructions, is such that a tear-strip collar is alternatively constructed such that the tear strips are not placed through the slits in the bottom part of the collar and thus the tearing force of the collar is concentrated on only predetermined zones of the airbag seam (FIGS. 28-32). Furthermore, it can be advantageously provided that a tear-strip collar is constructed such that the number of tear strips is preferably arbitrarily variable, and/or a tear-strip collar is provided with the characteristic that only a part of the energy of the airbag is absorbed by the tear strip, and/or a tear-strip collar is actively provided with the characteristic that a portion of the energy of the airbag is spread to the airbag seam and thus is not available for the tearing of fabric run holes, and/or a tear-strip collar is constructed with the characteristic that the energy of the airbag first on the airbag discharge seam is spread simultaneously and directly to the tear strips and to the seam, and/or the embodiment of the collar is such that it can spread the energy of the airbag according to the expansion behavior of the strips relative to the expansion behavior of the cover, and/or a tear-strip collar is functionally constructed in its operation such that the airbag discharge seam first undergoes loading at a time that is late relative to the impact of the bag on the seam.

In yet another airbag module according to the invention, especially according to the previously named constructions, it is provided that a tear-strip collar is constructed such that the tear strips are placed through slits (FIGS. 33 to 36). This can be advantageously further constructed in that a tear-strip collar is constructed such that a variable number of tear strips applies a pulling effect point-wise in the airbag seam expediently caused by the insertion of the tear strips through the slits, and/or a tear-strip collar is constructed with the result that the airbag force distributes the entire energy to the tear strips at an early stage, and/or a tear-strip collar pulls the airbag seam backward through the direction change into the slits.

Yet another airbag module according to the invention, especially according to the previously named constructions, is such that a tear-strip collar is especially alternatively constructed such that the tear strips "peel" instead of "fabric run holes" of larger holes in the tear-strip seam (FIGS. 37 and 38). In a refinement of this configuration it is preferred when tear strips are constructed such that in a first phase like in the other alternatives, small fabric run holes are torn, wherein more advantageously tear strips are constructed such that, in a second phase, a larger hole is peeled in the seam for even simpler and targeted severing of the bag, wherein more especially a construction of the tear strips is provided such that the tear strips are provided laterally with different "tabs" sewn into the seam and are used for tearing the holes in the second phase, wherein also advantageously the tear strip collar is constructed such that the "tabs" are tied alternatively on the tear strip with one, two, or more crosspieces, and/or ties are adapted to the tabs with crosspieces such that sufficient "batches" are present for tearing the fabric run hole and as little as possible, a not-torn seam remains between the fabric run hole and the larger hole for peeling. More advantageous constructions of these variants consist in that the tear strips are constructed as an individual part or as a bundle and/or an adjustment of the time tearing moment is provided for a bundle of tear strips by their guidance and thus in length such that they tear the holes one after the other, in order to thus keep the load peaks of the airbag low and/or a construction of the interfaces of load-bearing connections of warp threads and woof threads is constructed such that the "crossings" are each created as overshooting material lengths in the warp and woof directions, in order to prevent pulling out.

In yet another airbag module according to the invention, especially according to the previously named constructions, it is provided that a sewing of the tear strips in the collar is constructed such that a part of the energy of the airbag falls on the tear strips and another part falls directly on the tearing seam (FIGS. 39-41).

Yet another airbag module according to the invention, especially according to the previously named constructions, is such that passing through the tear strips before the assembly of the tear strip collar is carried out such that the full force of the deploying airbag is absorbed by the tear strips at an early stage (FIGS. 42 and 43), wherein advantageously more favorable OOP values (out of position) (in the extreme case, a child is set with its head directly in front of the deploying airbag) are realized such that the tearing seam is opened in the opposite direction of the deploying airbag at an early stage.

In yet a different airbag module according to the invention, especially according to the previously named constructions, it is provided that a connection of the airbag module is constructed such that it is inserted and clipped for mounting and thus the screwing process is saved (FIGS. 43-47). A preferred refinement consists in that a construction of a hook in a sheet-metal blank that is used for forming a tube from this blank, with this tube being used, in turn, for protecting the textile of the airbag from hot gases, wherein a construction of a clip from the previously named sheet-metal blank is more preferably provided, and wherein especially a use of the hook and the clip is more especially provided for mounting and fixing the position of the airbag module on the structure of the backrest.

Further preferred and/or advantageous constructions of the invention are given from the dependent claims and their combinations, as well as all of the present application documents and especially the explanations and illustrations of embodiments in the description and the drawing.

In summary, the invention creates, in particular, opening aids for an airbag seam under a cover, advantageously for a seat airbag, which increase robustness. That is, the weakened airbag tearing seams that are typical today are no longer needed. The seam opens earlier and in the opposite direction of the airbag deployment, farther away from an OOP ("out of position") head of a child. The airbag is thus less aggressive.

The robustness minimizes the development expense and the expensive present-day testing and the risk of recalls. Because the "previously opened" airbag tearing seam obstructs the bag less, the deployment of the bag is better, associated with less tolerance, and is also less different for lower and higher temperatures. Non-weakened seams also solve the problem of durability for normal use and for assembly. Furthermore, this technology supports future "large" bags for more safety and less aggressiveness for stricter OOP conditions.

As other advantageous and also independently inventive constructions, modules could have a flatter construction and are only hooked and clipped from the outside of the seat.

In summary, the invention creates a milestone for better airbag response for significantly lower costs and risks.

BRIEF DESCRIPTION OF THE DRAWINGS

The invention will be explained in detail below using embodiments with reference to the drawing only with examples in which FIG. 22 shows the fabric web of the ninth embodiment from FIGS. 17 and 18 in yet another manufacturing stage in a schematic plan view diagram, FIG. 23 shows a schematic side view for illustrating a detail of the ninth embodiment according to the manufacturing stage corresponding to FIG. 22, FIG. 28 shows a schematic plan view of a manufacturing stage of an additional eleventh embodiment, FIG. 29 shows a schematic plan view of another manufacturing stage of the eleventh embodiment according to FIG. 28, FIG. 30 shows a schematic plan view diagram of yet another manufacturing stage of the eleventh embodiment according to FIGS. 28 and 29, FIG. 31 shows a schematic side view diagram of another manufacturing stage of the eleventh embodiment according to FIGS. 28-30, FIG. 32 shows a schematic detail view of yet another manufacturing stage of the eleventh embodiment according to FIGS. 28-31, FIG. 33 shows a schematic side view diagram of yet another manufacturing stage of the eleventh embodiment according to FIGS. 28-32, FIG. 34 shows a schematic detail view of yet another manufacturing stage of the eleventh embodiment according to FIGS. 28-33, FIG. 35 shows a schematic plan view diagram of another manufacturing stage of the eleventh embodiment according to FIGS. 28-34, FIG. 36 shows a schematic side view diagram of yet another manufacturing stage of the eleventh embodiment according to FIGS. 28-35, FIG. 39 illustrates, in a schematic side view, an initial state for the function of an embodiment of the airbag module, FIG. 40 illustrates, in a schematic side view, a trigger state for the function of the embodiment of the airbag module coming from FIG. 39, FIG. 41 illustrates, in a schematic side view, an initial state for the function of another embodiment of the airbag module, FIG. 42 illustrates, in a schematic side view, a trigger state for the function of the additional embodiment of the airbag module coming from FIG. 41.

DETAILED DESCRIPTION OF THE INVENTION

Figure 1:
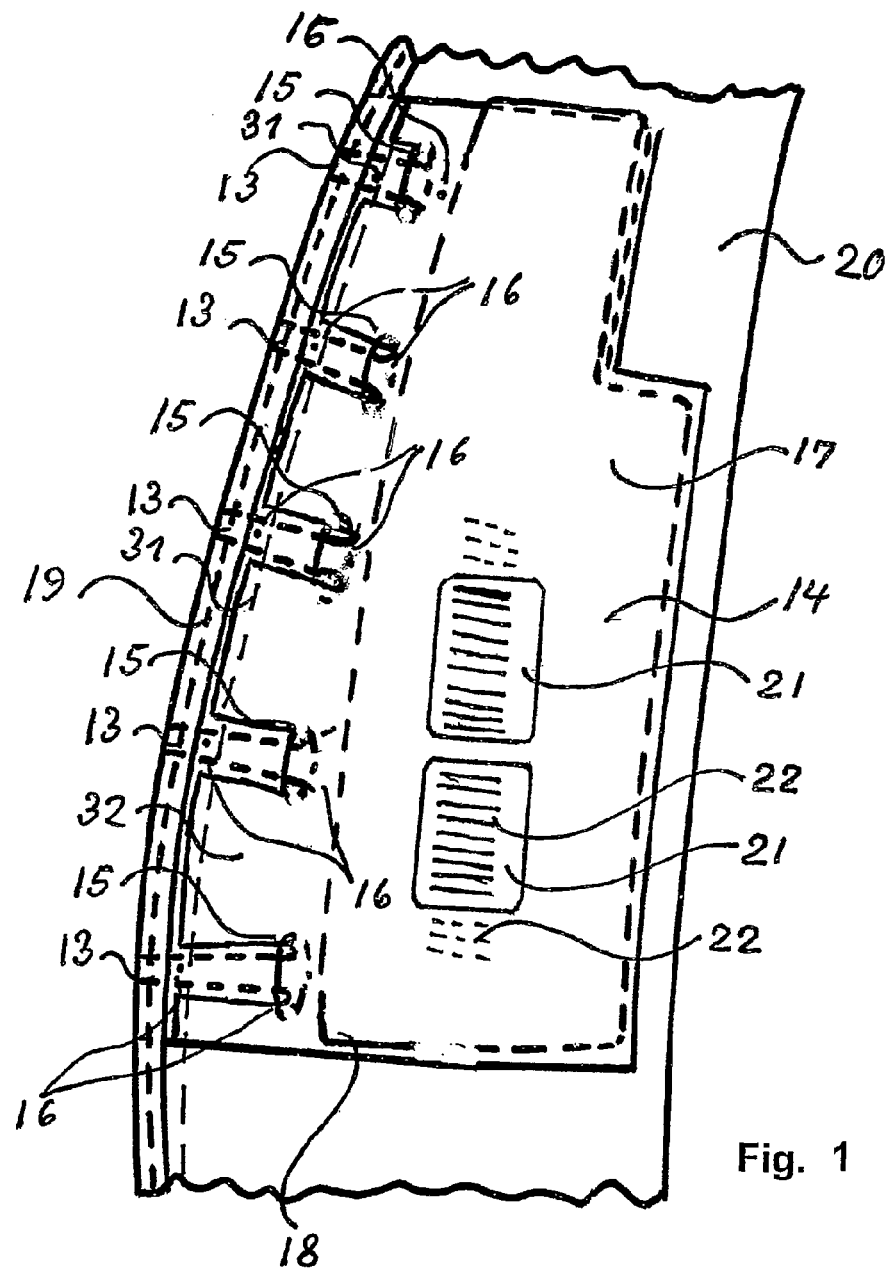
FIG. 1 shows, schematically and partially, a seat equipped with an airbag module according to a first embodiment in a sectioned view.

With reference to the embodiments and application examples described below and shown in the drawings, the invention will be explained in detail only with examples, i.e., it is not limited to these embodiments and application examples or to each of the feature combinations within individual embodiments and application examples. Features of methods and apparatuses are produced analogously also from each of the descriptions of apparatuses and methods, respectively.

Individual features that are specified and/or shown in connection with actual embodiments are not limited to these embodiments or the combination with the other features of these embodiments, but instead could also be combined within the scope of technical feasibility with any other variants, even if these are not addressed separately in the present documents, and especially with features and constructions of other embodiments.

Identical reference symbols in the individual figures and diagrams of the drawings refer to components that are identical or similar or have identical or similar effects. With reference to the diagrams in the drawing, those features are also made clear that are not provided with reference symbols, independent on whether such features are described below or not. On the other hand, features that are included in the present description, but are not visible or illustrated in the drawing, are also easily understandable for someone skilled in the art.

Features of the apparatus and method are also produced from graphical and written descriptions of methods or apparatuses.

Furthermore, the list of reference symbols at the end of this description is an explicit component of this description and the references on figures of the drawing specified in the scope of individual constructions are herewith also explicitly a component of the following detailed description of the embodiments shown in the figures of the drawing, in order to avoid simple repetition of the corresponding information below on the individual figures.

Figure 2:
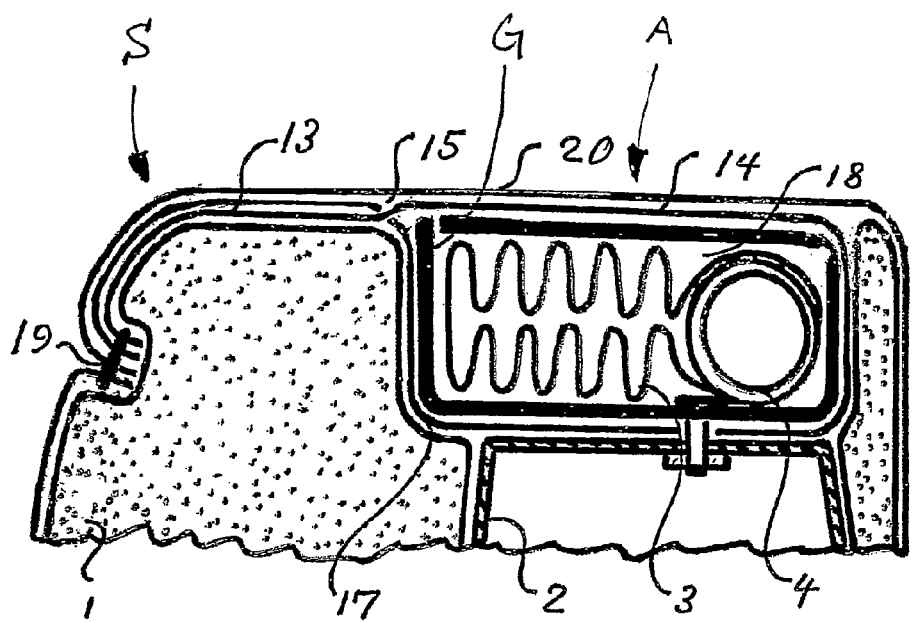
FIG. 2 shows the first embodiment of an airbag module in a seat according to FIG. 1 in a schematic cross section through the seat.

In FIGS. 1 and 2, in order to give an overview on a seat S and an airbag module A, as they are generally arranged in the sense of the present invention, just such an airbag module A is shown, surrounded by the seat foam 1 of a seat backrest 2 of a seat S, such as, for example, a vehicle seat (each shown only in cutout) (see, in particular, FIG. 2). The airbag module A includes a folded airbag 3 stored within a housing G of the airbag module A and a gas generator 4 that makes available, in the trigger case of the airbag module A, the gas for inflating the airbag 3 (see, in particular, FIG. 2). This construction is indeed only an example, but for all of the other embodiments treated in the present documents, a basic overall construction is specified with which detail constructions discussed more only below are to be combined.

In principle, the novel aspect of the invention compared with earlier techniques specified above consists in the application of several tear strips 13 parallel to each other (not to be understood absolutely geometrically, but instead functioning essentially parallel to each other) according to the embodiment shown in FIG. 1. In order to achieve this economically, the tear strips 13 is cut, lasered, or the like from a fabric web 14. So that the tearing effect is produced, the tear strips 13 are placed through holes 15 in the lower part of the fabric web 14. The fabric parts 32 between the tear strips here remain as a protective shield between the airbag 3 and possible seat foam 1 lying above on the airbag 3. The tear strips 13 are fixed in position according to FIG. 1 on the lower part of the fabric web 14 with a tearing, weak assembly seam (not shown) that tears when there is a crash or fixed with "weld points" 16. This assembly of the fabric web 14 forms a pocket 17 for holding the airbag module 18. The front end of the assembly of the fabric web 14 is sewn with an airbag seam 19 of a seat cover 20. The pocket 17 has openings 21, in order to scan or to be able to scan a barcode 22 of the airbag module 18. In order to guarantee the certified assembly and correct position of the airbag module 18 in the pocket 17, advantageously additional barcodes 22 are attached, covered by the fabric web next to the holes 15, wherein, in particular, these additional barcodes may not be visible.

FIG. 2 shows the diagram in FIG. 1 in cross section through the seat S. The airbag module A or 18 is enclosed by the fabric web 14 from which the pocket 17 was formed. Tear strips 13 and the fabric web 14 lying above are sewn as an assembly with the seat cover 20 by means of the airbag seam 19.

Figure 3:
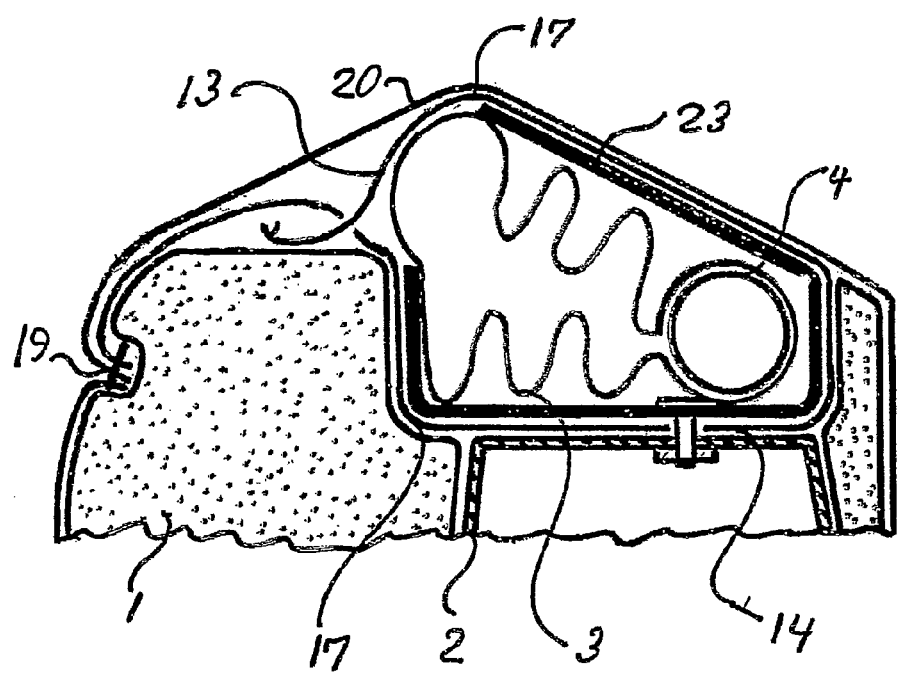
FIG. 3 shows the section diagram of FIG. 2 for a crash in a schematic diagram.
Figure 4:
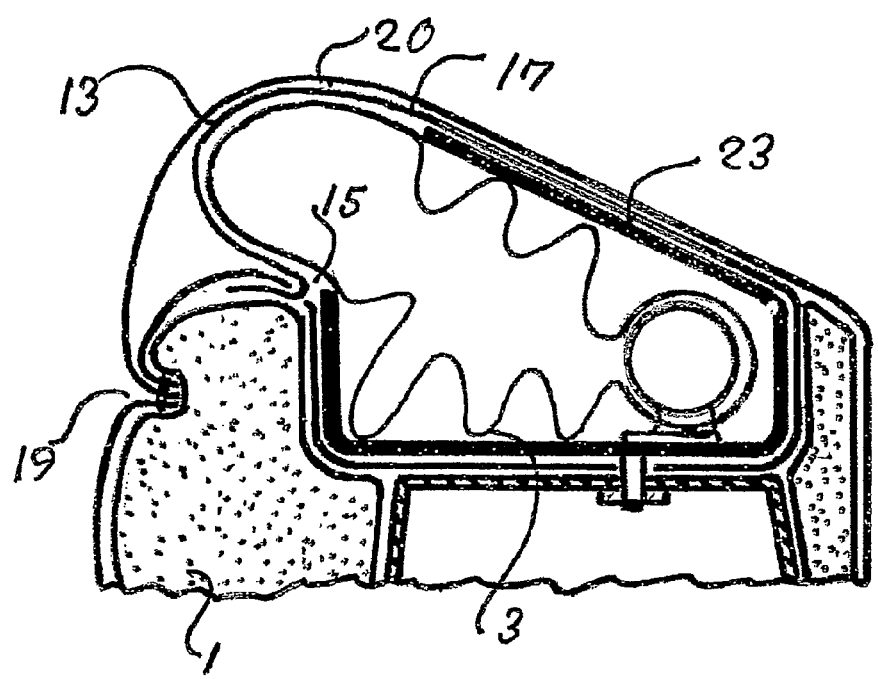
FIG. 4 shows, starting from the diagrams in FIG. 3, the further discharge of the airbag in a schematic diagram.

FIG. 3 shows the section diagram of FIG. 2 in the event of a crash. The airbag 3 lifts a cover 23 of the airbag module A or 18 and in this way tears all of the tear strips 13 made from the fabric web 14 out from the airbag seam 19. This produces holes in the airbag seam 19 and these holes greatly weaken the airbag seam 19. The airbag 3 impacts a moment later on the torn and thus greatly weakened airbag seam 19. This is advantageous for the airbag passage and the airbag seam 19. The latter is thus robust itself, i.e., it does not have to a weakened construction or can have a less weakened construction. Tolerances of the airbag seam 19 no longer have a noticeable influence on the airbag deployment. Starting from the diagrams in FIG. 3, FIG. 4 shows the further discharge of the airbag 3 and thus, under some circumstances, according to the construction, a transfer of movement of the airbag 3 to the movement of the tear strips 13 at twice the speed according to laws of pulleys, as can be inferred from the diagrams.

Figure 5:
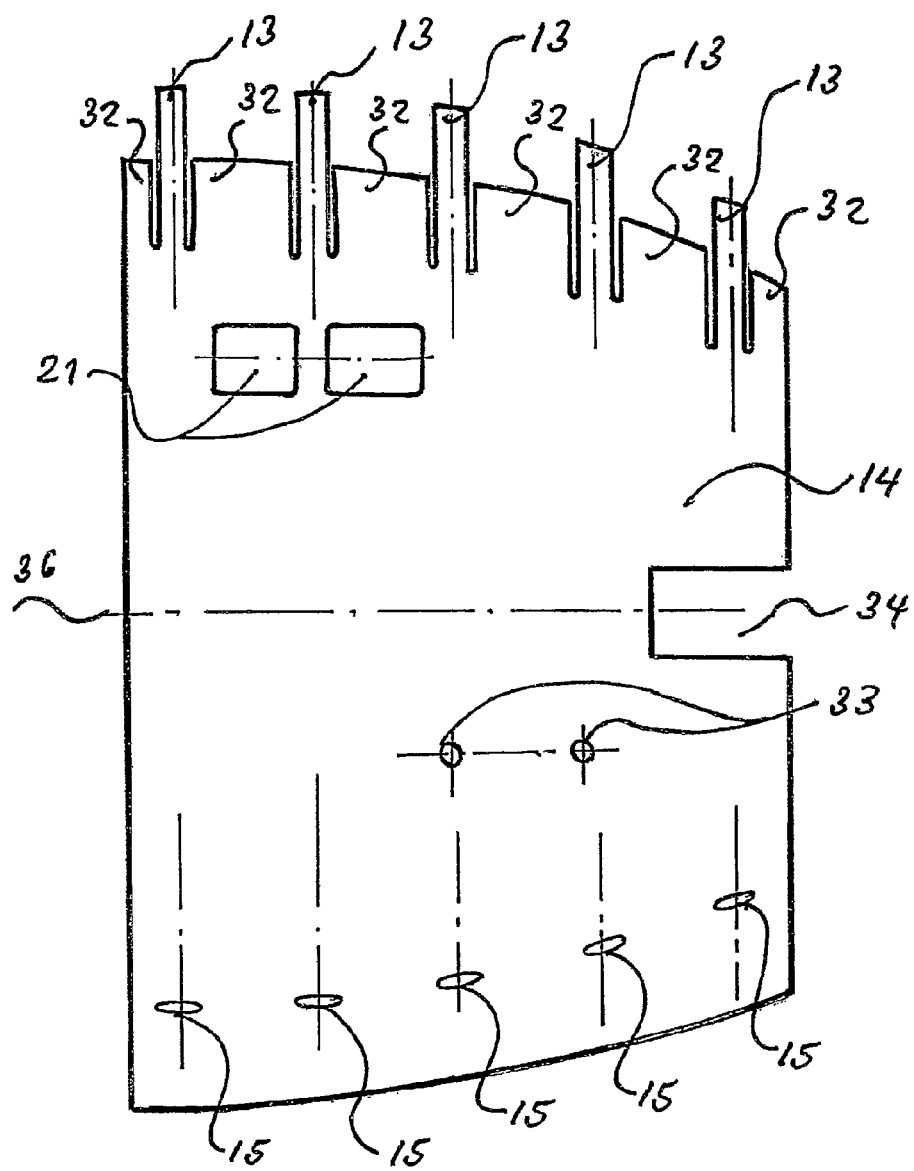
FIG. 5 shows, in the scope of another embodiment, an apparatus for the manufacturing of a pocket for the airbag module in a schematic diagram.

For better understanding, in FIG. 5 the fabric web 14 is shown in the pre-cut part with the formed tear strips 13 and the fabric parts 32 that lie in-between and protect a possible segment of seat foam 1 lying on the airbag module A or 18 from contact with the airbag 3 and thus prevent chunks of foam flying around. A continuous foam cover 35 on the opposite side of the fabric part 32 has the same effect. In the latter case, the seat foam 1 is advantageously covered with the fabric part 32, with this foam lying in front of the airbag module A or 18. On which side the fabric parts 32 and the continuous foam cover 35 are placed depends on the individual characteristics of the seat foam 1 that must be covered. The halves of the fabric part are positioned relative to each other with a crease 36. A cutout 34 is sewn so that a simple access to a plug (not shown) of the airbag 3 is guaranteed (not shown). The openings 21 permit the access to the barcode 22 of the airbag module 18 or cover the part of the barcode that proves that the pocket 17 formed from the fabric web 14 also includes the airbag module. This is, as an added effect, a so-to-speak no-cost certification of assembly.

In summary, the constructions according to FIGS. 1-5 have the following features and advantages:

This alternative of the tear-strip technology combines several tear strips into one action unit for several simultaneously torn holes in the airbag seam. This leads to greater robustness of the airbag discharge.

During the cover opening of the module, the airbag has already torn several holes in the airbag discharge seam. The fabric cover carrying the tear strips is used for the protection from chunks of foam flying around and also the tear strips protect the foam from the airbag.

The fabric parts produced between the tear strips that have been cut or lasered from these parts protect possible seat foam lying on the airbag from forceful contact with the airbag and thus from chunks of foam flying around.

Advantages with reference to one example: assume that the airbag seam to be opened has a length of 350 millimeters. For a stitch length of 5 millimeters, this gives 70 stitches to be opened by the airbag. The latter are sewn today, that is, according to prior art known from practice, with a weakened thread with a tearing strength of ca. 20 N. This weakened thread is very problematic, because it has large tolerances and thus tears easily during use at the lower tolerance limit and negatively influences the deployment of the airbag at the upper tolerance limit. Therefore, the seam must undergo expensive testing by shot tests during the manufacturing time. In the presently considered version, in any case, 70 stitches× 20 N=1400 N force must be applied, in order to open the seam. According to the present invention, e.g., 5 pieces of strips sewn together into an airbag seam, with each strip having a width of 8 millimeters, 1-2 stitches are torn through corresponding to 5 positions. Because the airbag must tear through only a maximum of 10 successive stitches, these do not have to be weakened and can have an arbitrarily high tolerance. Typically, a non-weakened thread has a strength of 40 N. Thus, the airbag must only tear through 10×40 N=400 N—less than one third compared with today's prior art. This helps the "performance" of the airbag and the robustness of the seam, i.e., the seam always open very quickly and uniformly even for the highest tolerance in strength. Testing is then no longer necessary. Durability in normal use is also no longer an issue.

Figure 6:
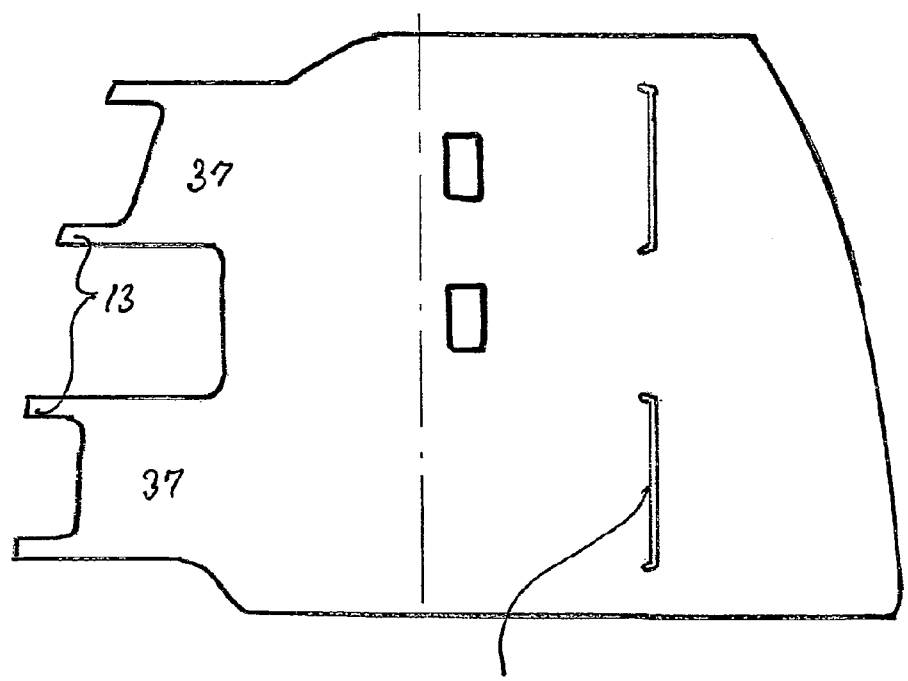
FIG. 6 shows a fabric web in the pre-cut part with the formed tear strips in a schematic diagram.
Figure 7:
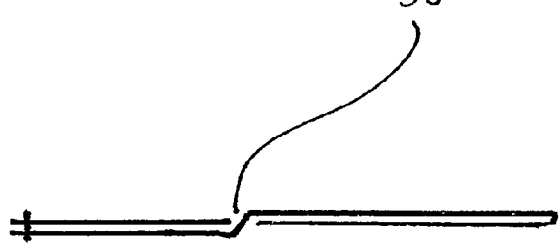
FIG. 7 shows a fabric web of a third embodiment in the pre-cut part with formed tear strips in a schematic plan view diagram.
Figure 8:
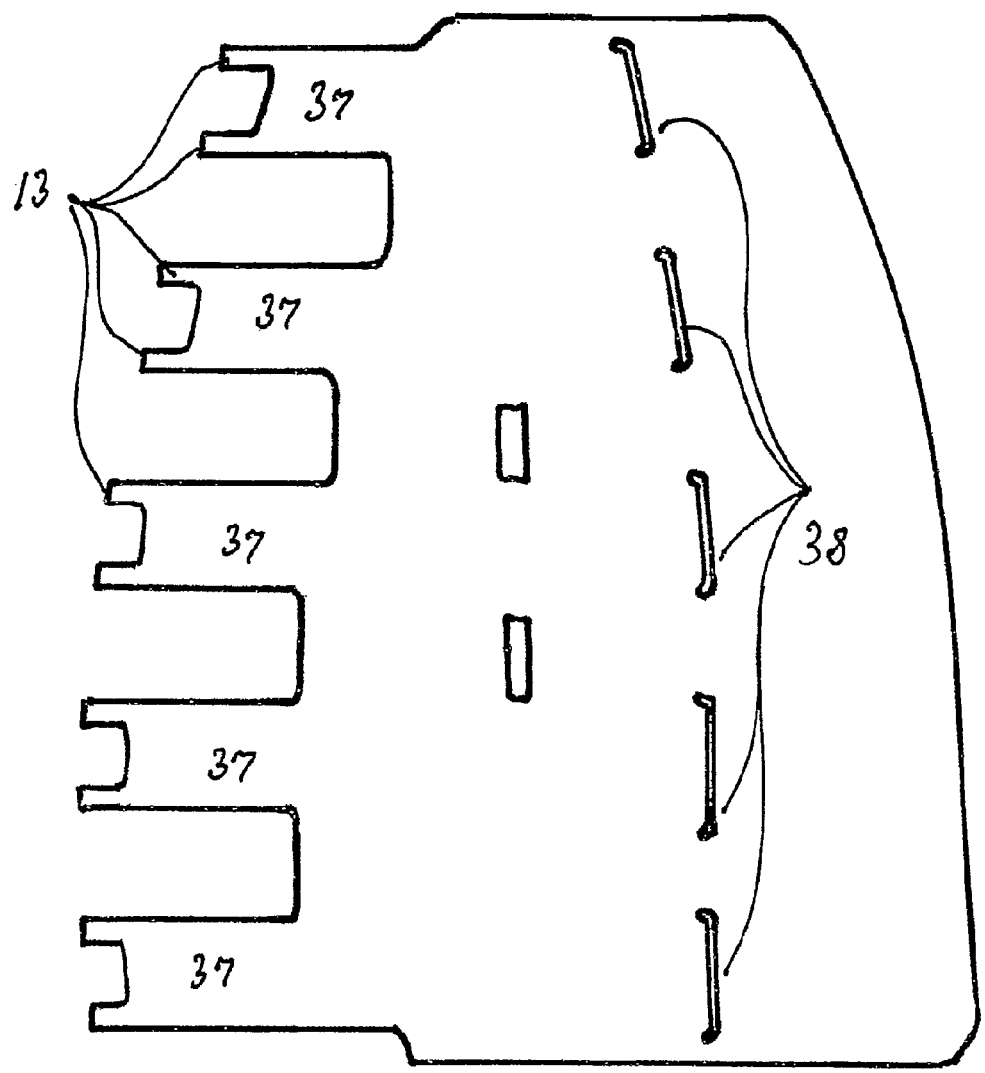
FIG. 8 shows the fabric web of the third embodiment from FIG. 7 in a schematic cross section.
Figure 9:
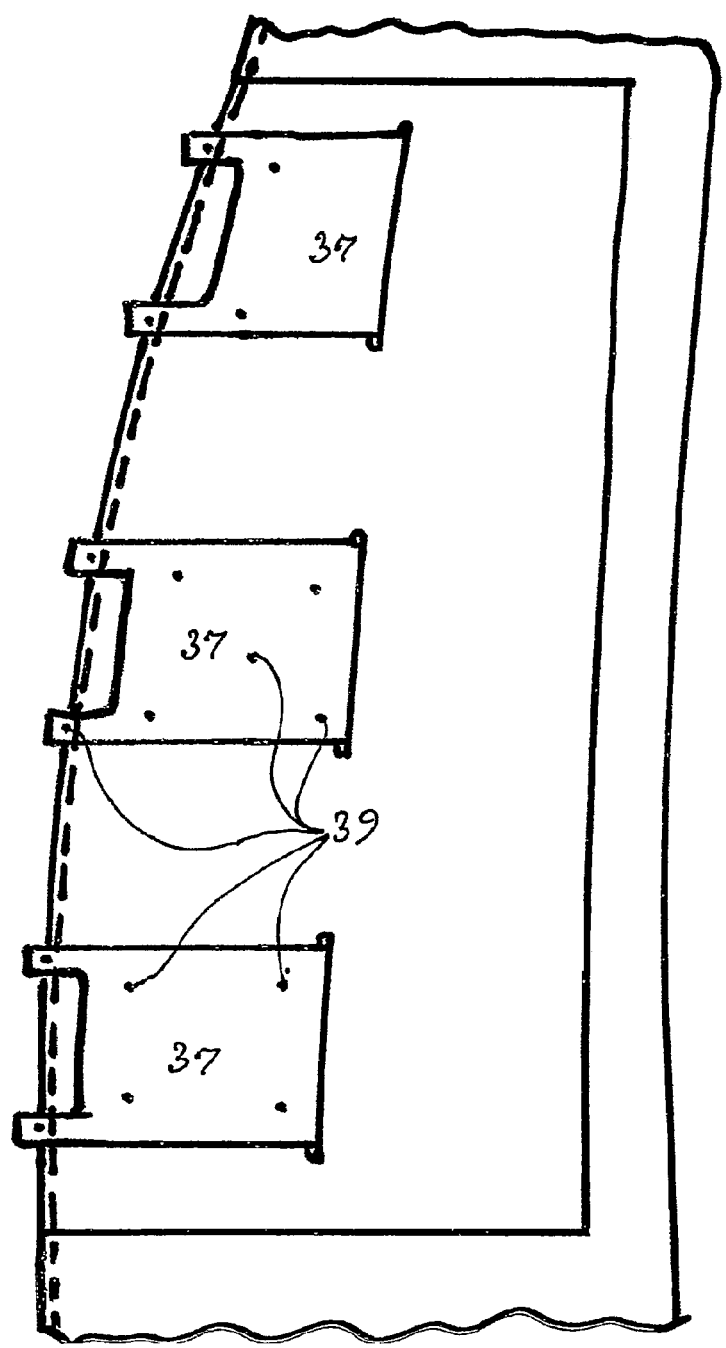
FIG. 9 shows a fabric web of a fourth embodiment in the pre-cut part with formed tear strips in a schematic plan view diagram.
Figure 10:
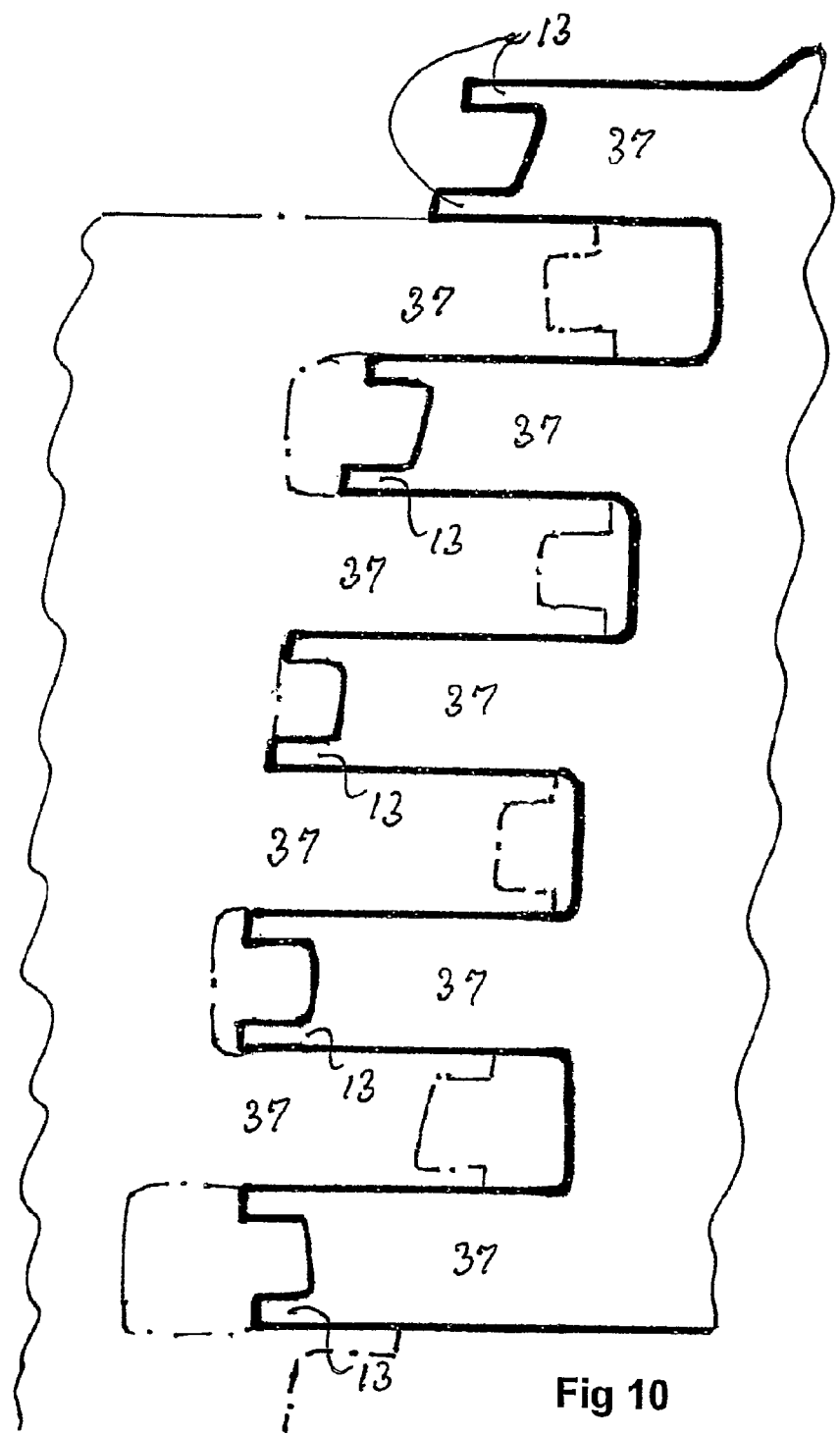
FIG. 10 shows a fabric web of a fifth embodiment in a schematic plan view diagram.

FIG. 6 shows another alternative embodiment. For better, more stable handling of the tear strips 13, every two are combined. The airbag 3 presses better against a resulting wider strip 37. These wide strips 37 are, as previously mentioned, better drawn or set through the larger, adapted slits 38, as is to be inferred from FIG. 7. This variant in which the airbag module contains a fabric web constructed such that several, advantageously at least two tear strips are combined into a wide strip has clear advantages in the handling and the airbag arrangement. FIG. 8 shows another alternative embodiment. Here, five wide strips 37 with ten tear strips 13 are shown. The number of tear strips 13 is easily optimized by tests. Several tear strips 13 produce, on one hand, more torn holes in the airbag seam 19 and thus the beginning of several more easily tearing fabric run segments. On the other hand, more tear strips 13 mean a higher tensile force for the deploying airbag 3. Preferred are, for example, eight tear strips 13 on four wide strips 37 with a width of, e.g., 6 mm for a stitch length of approximately 4 mm to 5 mm. FIG. 9 shows an alternative with three wide, penetrated strips 37 fixed in their position with hot pins 39 or laser points. FIG. 10 shows an example of an optimized interlacing of the fabric web 14. Here, the wide strips 37 have the same width. Thus, the airbag module can include such a fabric web, so that several, preferably at least two tear strips are combined into one wide strip. Alternatively or additionally, a fabric web can be included and constructed so that it includes wide strips that allow, together with their intermediate spaces, an interlacing of other fabric webs.

Figure 11:
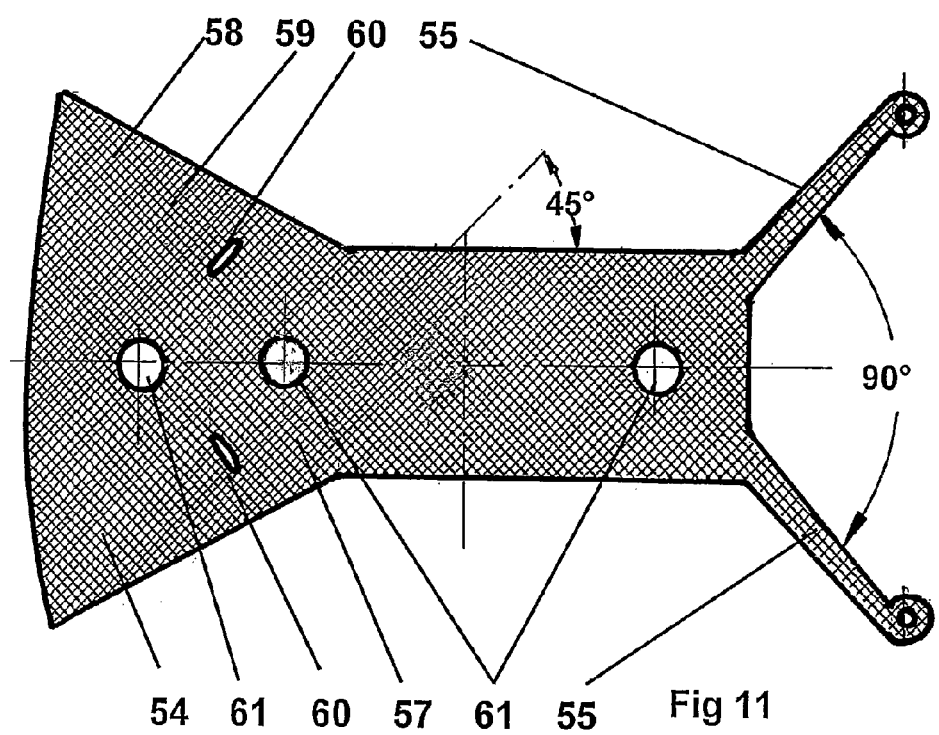
FIG. 11 shows a fabric web of a sixth embodiment in a schematic plan view diagram.
Figure 12:
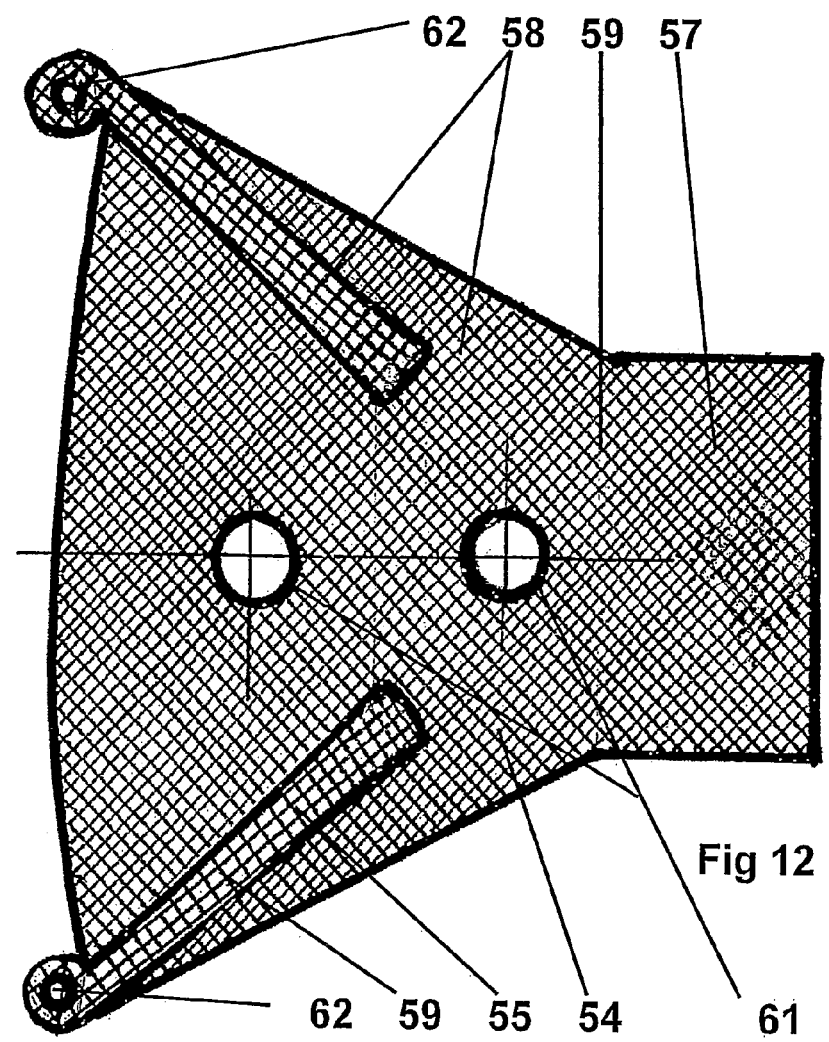
FIG. 12 shows a fabric web of a seventh embodiment in a schematic plan view diagram.
Figure 13:
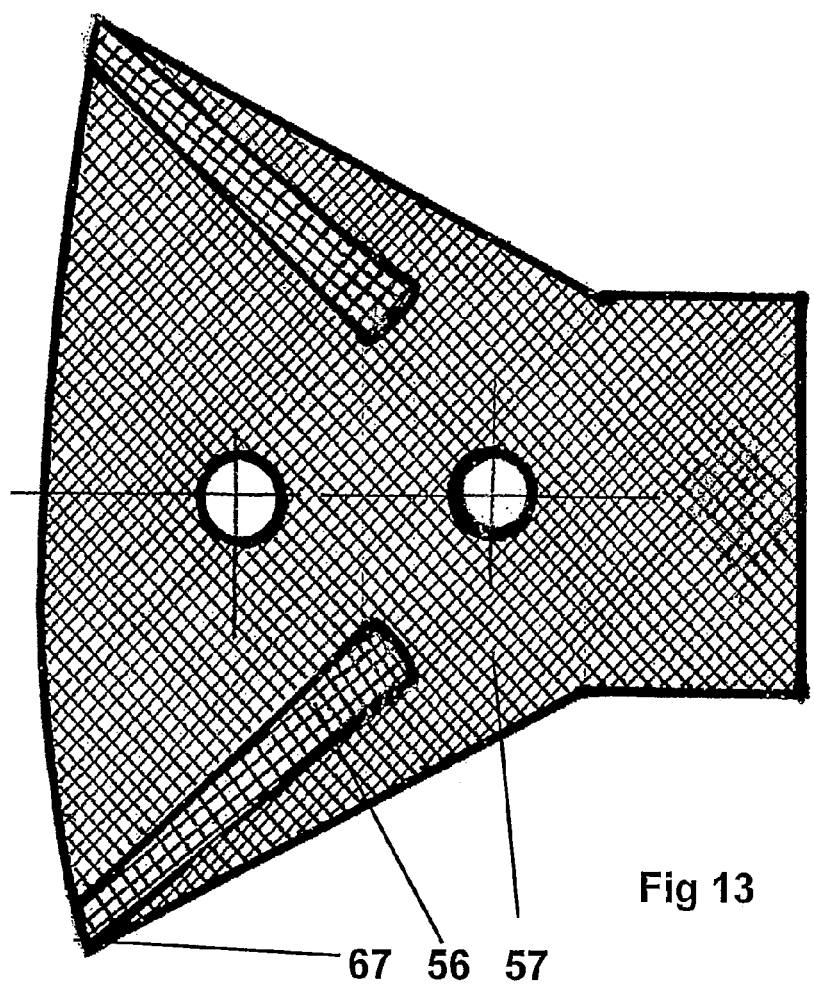
FIG. 13 shows the fabric web of the seventh embodiment from FIG. 12 in another manufacturing stage in a schematic plan view diagram.
Figure 14:
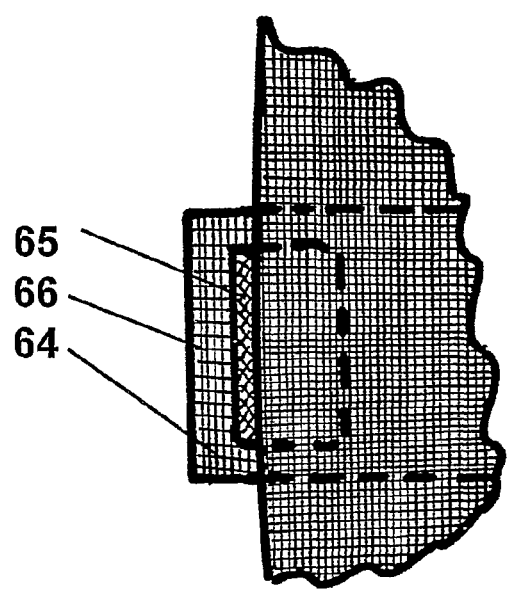
FIG. 14 shows a detail in the manufacturing of the seventh embodiment from FIGS. 12 and 13 in a schematic plan view diagram.

Another alternative is an airbag collar 54 shown in FIG. 11 in which tear strips 55 are spread at 90 degrees, in order to economically cover a large tearing area of the seam (not shown). For this purpose, a tear-strip collar 56 is cut out from a textile 57 such that a tear strip 55 has continuous warp threads 58 and the other tear strip 55 has woof threads 59 continuously. Thus, their sufficient strength and "comb shearing strength" is achieved. FIG. 12 shows the further manufacturing of the tear-strip collar 56. For this purpose, as shown, it is folded together and both tear strips 55 are placed through holes 60. Three holes 61 are used for the correct positioning. At the ends of the tear strips 55, two holes 62 are similarly formed that are similarly suspended in pins (not shown) for positioning. FIG. 13 shows that the tear-strip collar 56 were then cut at the end of the tear strips 55 with a hot blade (not shown). In this way, at 67 the tear strips 56 are "welded" with the textile 57 of the rest of the tear-strip collar 56 such that this part survives the transport and handling as a fixed assembly 62. This assembly 62 is then sewn together to form the airbag seam (not shown) like in the other tear-strip collar alternatives. In FIG. 14 it is shown how this hot-blade cutting and welding technique functions in the other shown tear-strip collars 40, etc. Wide strips 37 are here placed through slits 38 (compare, e.g., FIG. 8) simultaneously with a special comb like with fingers of one hand (in this case from sheet metal or the like). The narrow tear strips 63 are connected to each other such that loops 64 are produced. These loops 64 are then suspended in molded sheets 65 for positioning. Also here, a hot blade cuts away transverse connection 66 and welds the narrow tear strips 63 with the textile 57 of the tear-strip collar 56. Further details were illustrated above.

Figure 15:
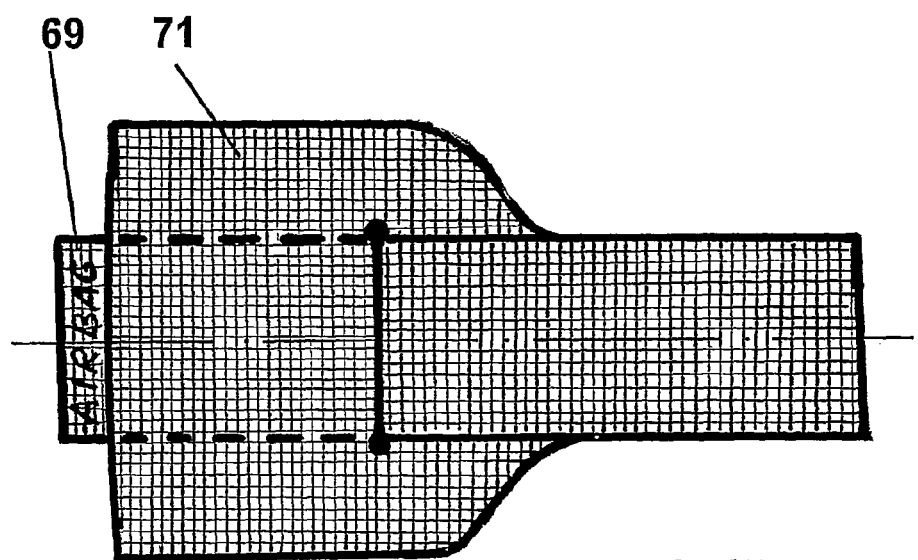
FIG. 15 shows a fabric web of an eighth embodiment in a schematic plan view diagram.
Figure 16:
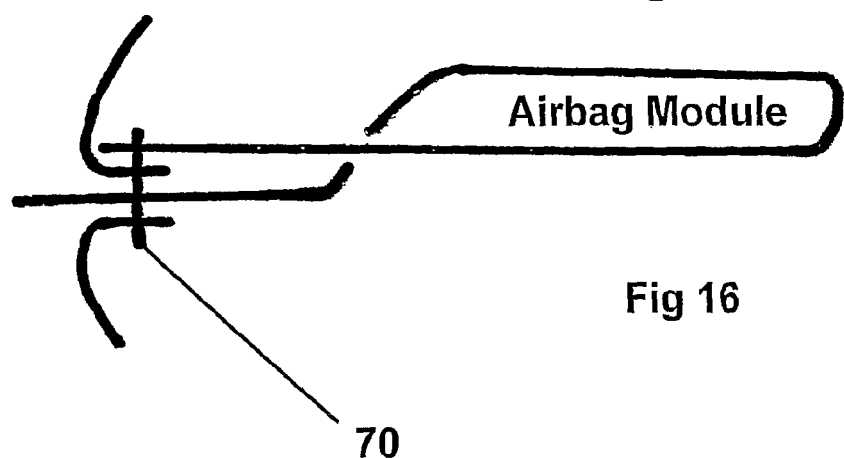
FIG. 16 shows a schematic side view for illustrating a detail of the eighth embodiment according to FIG. 15.

Yet another alternative is shown in FIGS. 15 and 16. Here, a tear strip 68 is constructed at the end as airbag label 69. For this purpose, the tear strip 68 is placed through an airbag discharge seam 70 and sewn with this seam. The other part of the tear-strip collar is always sewn, as shown in FIG. 16. A shown tear-strip collar 71 can be expanded upward and/or downward accordingly with additional tear strips (not shown).

Figure 17:
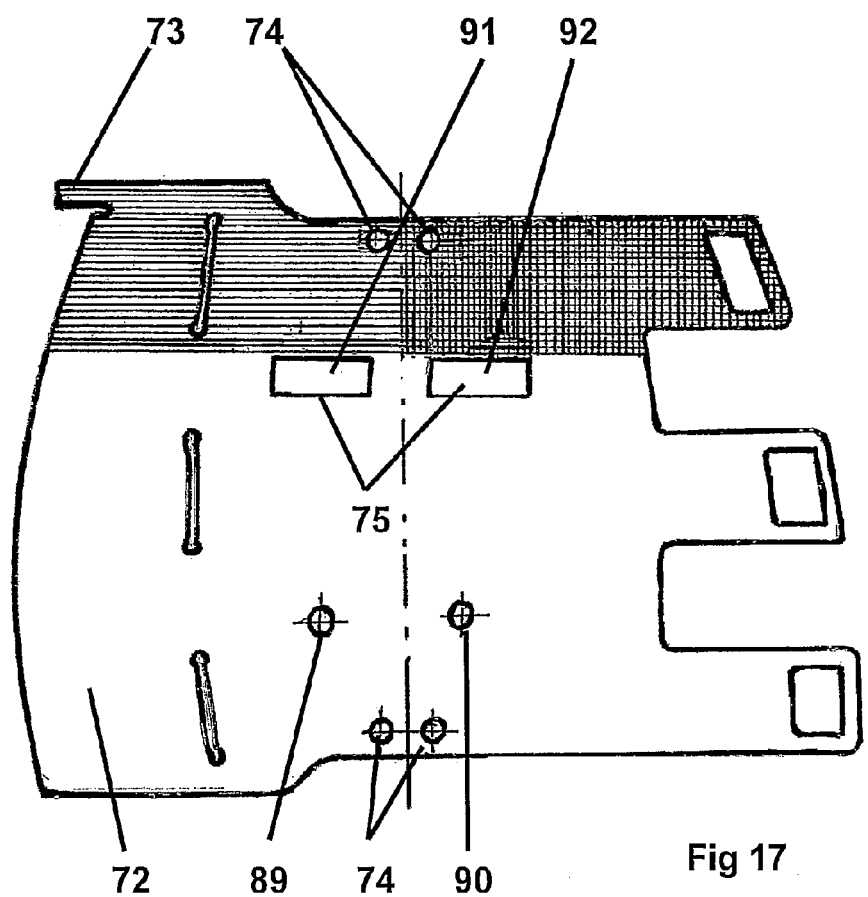
FIG. 17 shows a fabric web of a ninth embodiment in a schematic plan view diagram.
Figure 18:
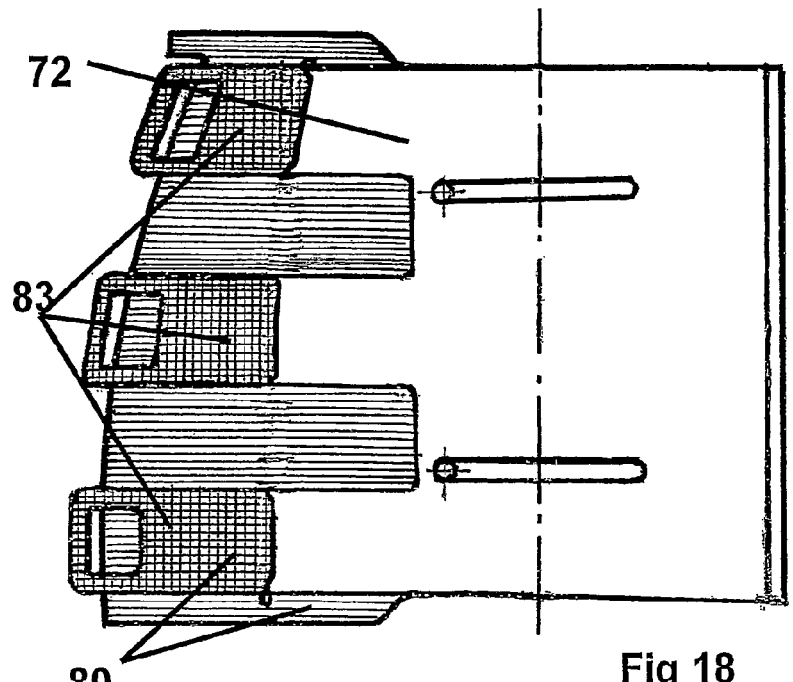
FIG. 18 shows the fabric web of the ninth embodiment from FIG. 17 in another manufacturing stage in a schematic plan view diagram.
Figure 19:
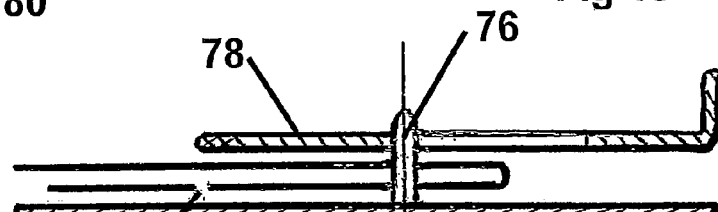
FIG. 19 shows a schematic side view for illustrating a detail of the ninth embodiment according to FIGS. 17 and 18 in another manufacturing stage.
Figure 20:
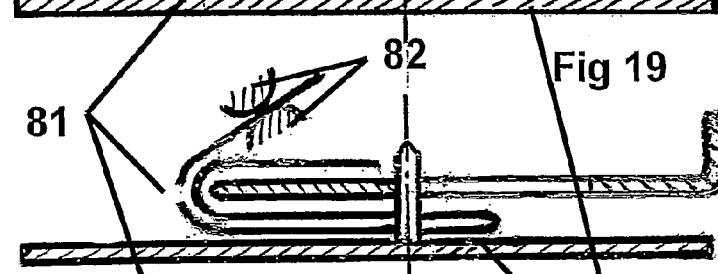
FIG. 20 shows a schematic side view for illustrating a detail of the ninth embodiment according to FIGS. 17 and 18 in yet another manufacturing stage.
Figure 21:
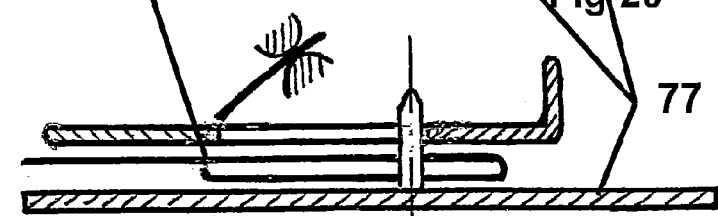
FIG. 21 shows a schematic side view for illustrating a detail of the ninth embodiment according to FIGS. 17 and 18 in yet another manufacturing stage.
Figure 24:
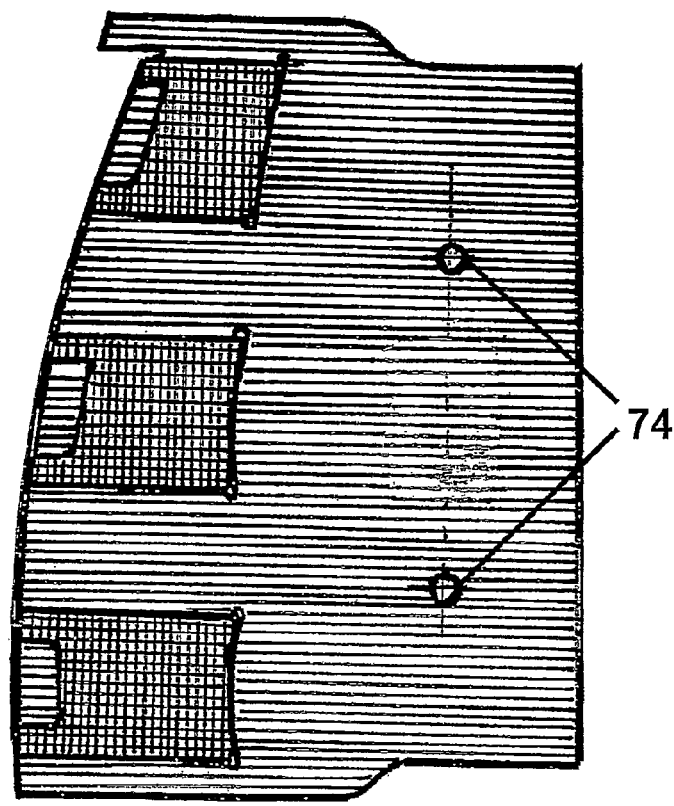
FIG. 24 shows the fabric web of the ninth embodiment from FIGS. 17 and 18 in another manufacturing stage in a schematic plan view diagram.
Figure 25:
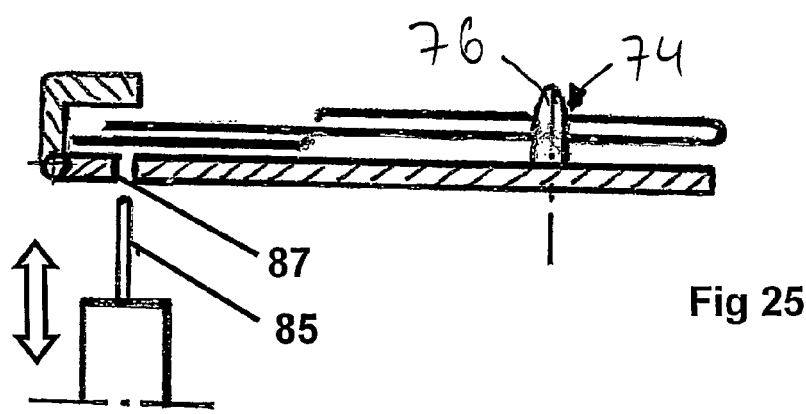
FIG. 25 shows a schematic side view for illustrating a detail of the ninth embodiment according to the manufacturing stage corresponding to FIG. 24.

Another alternative of an effective manufacturing of the tear-strip collar 56 is shown in FIGS. 17-25. FIG. 17 shows a cutout or lasered pre-cut part 72. At the top left, at the beginning of the sewing operation, a marker (not shown) is integrated, in order to fix the sewing beginning for sewing machines controlled by light cabinets. Other innovations compared with what was shown above are four positioning holes 74 and a viewing hole 75 for reading the barcode 22 on the airbag module A or 18 and the earlier described certification of the correct assembly. The fastening holes 92 and 89 are used when the tearing collar 71 is mounted, e.g., on the left seat. Here, one fastening hole 91 is used as viewing hole 75 for the module barcode (not shown). If the tear-strip collar 71 is mounted on the right seat, fastening holes 90 and 91 are used. The fastening hole 92 is then the viewing hole 75. Tear strips 83 and 84 lie one above and one below the pre-cut part 72, which, however, has no effect on the function. FIG. 22 shows the folded-together pre-cut part 72 such that its four positioning holes 74 are placed in two bolts 76 on one plate 77. FIG. 23 shows this is section. A slide plate 78 is likewise placed in the bolts 76, with the slits 79 of this plate permitting a guided movement (FIG. 18). FIG. 19 shows this in section. In FIG. 20, it is shown that folded-together textile ends 80 are pivoted onto the slide plate 78. Here, the continuous textile end 80 with slits 81 is held in the shown position with fingers 82 of a person or a robot. Then the slide plate 78 is pushed toward the "left" and thus takes the wide tear strips 83 along, with these strips then falling into the position predetermined on the plate 77 (FIG. 21). The narrow tear strips 84 are here connected to each other cross-wise, so that they have a stable position. FIG. 24 shows the wide tear strips 83 that are placed through the slits 79 and whose subsequent narrow tear strips 84 with the pre-cut part 72 positioned on top are separated with a hot blade 85. In this way it is achieved that the narrow tear strips are fired together with the pre-cut part 72. Thus, the tear-strip collar 56 is a robust part that is sewn together into the airbag seam 19 in this state. Furthermore, this hot-cutting process fuses the edge threads such that they do not peel when tearing in the event of a crash (also called comb shearing strength). For this purpose, as shown in FIG. 25, advantageously a hot blade 85 is pushed through a slit 87 in the plate 77 (e.g., with an air cylinder). In contrast, there is then a static, pushed together or folded together counter support 88.

Figure 26:
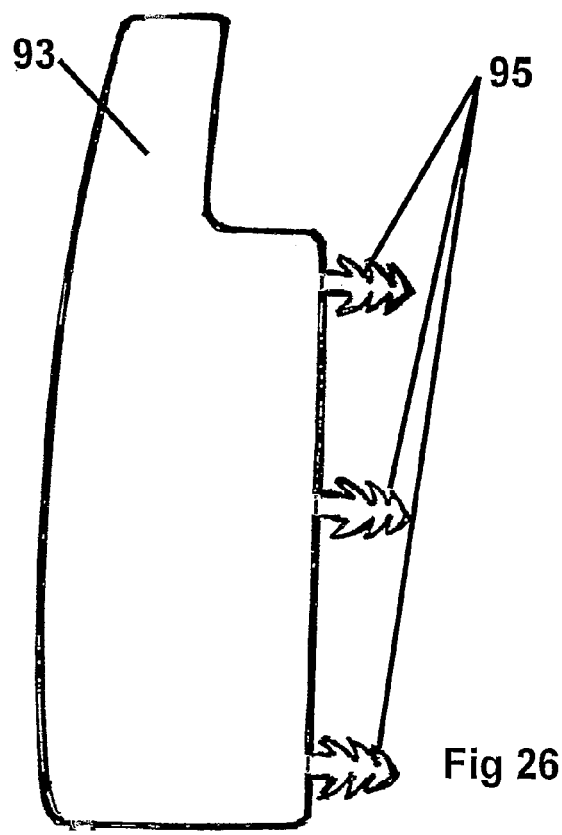
FIG. 26 shows a schematic side view for illustrating a tenth embodiment.
Figure 27:
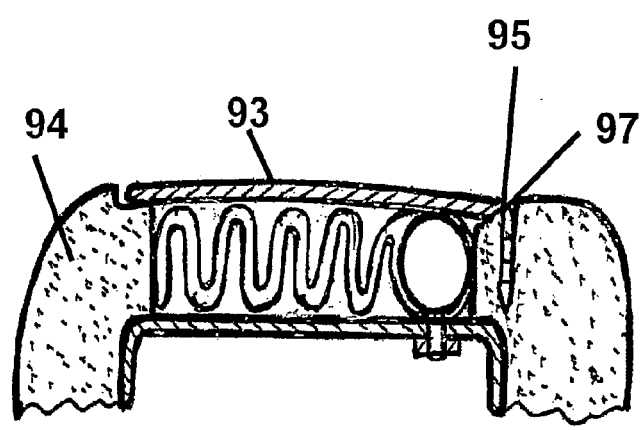
FIG. 27 shows a schematic cutaway overall view for illustrating the tenth embodiment according to FIG. 26.

Another possible optimization of the invention is shown in FIGS. 26 and 27. The background of the invention, as realized in the previously discussed embodiments, is that "hardcover" modules are typically used as alternatives, i.e., the airbag is held in a housing that is sealed over the surface with the foam of the seat. The other alternative to be discussed now is the use of an airbag with a "soft-cover" module, i.e., the airbag is housed only in a textile sack. Here, a cover with a foam tab integrated in the seat foam is used for a smooth-surface covering. The solution according to the invention for the problem in the use of economical soft-cover modules is the cover 93 shown in FIGS. 26 and 27 that is set in a seat foam 94 with a part of molded clips 95 or is alternatively placed in slits in the seat foam after assembly of the airbag with clips 95, as shown in the section diagram in FIG. 27. The clips are integrated on the cover 93 by means of a film hinge 97 and thus can be tilted by 90 degrees. Advantages are significant cost savings in comparison with hardcover housings and reduction in seat width with respect to the soft-cover module with a significantly thicker foam tab.

Another aspect of the invention on this subject is the conversion of a collar type that is often used to the tearing collar technique, in order to obtain a significantly "more robust" seam despite a non-weakened airbag seam. In FIGS. 28-36, the individual optimization steps are shown in which each individual step also represents an independent aspect of the invention whose entirety then leads to the optimal result. The basis of the consideration is EP 0 782 944 A1. This technique is used in most current TOYOTA automobiles and many others at the moment in connection with a weakened airbag tearing seam 101, as is known from practice. For this technique, because the airbag 103 has a very sensitive reaction to the strength of the seam, recall actions have already had to be performed. The construction in which the inner part of the seat cover is partially reinforced and a part of the opening force of the bag is led across a wide strip 99 on a weakened tearing seam 101 is taken into account (see EP 0 782 944 A1, especially FIG. 12 and others therein).

Step 1: A seat sidewall reinforcement and the strip 99 are made from one piece 98. Both ends are sewn folded with the airbag tearing seam 101 as shown schematically in FIG. 32. This is a cost saving.

Step 2: Like step 1; however, the strip 99 is cut at its end so that two tear strips 100 are produced (see FIG. 29). These tear strips 100 are somewhat wider than the stitch length of the airbag seam 101, so that they each tear through one to two stitches 102. A hole is produced by fabric runs around the two seam tears as the beginning of the airbag passage (not shown). This simplifies the opening of the seam for the airbag 103 by a factor of at least 2!

Step 3: A collar 104 is made wider so that, across the entire width, additional tear strips 100 are cut/lasered (see FIG. 30).

In the event of a crash, this produces a corresponding number of seam tears distributed over the length of the seam. FIG. 32 shows the schematic for folding around the airbag. The tear strips 100 are hot-welded at the edge with the lower part of the collar for fixing during the sewing and in order not to let the transverse threads be torn out in the event of a crash (see FIG. 31). A disadvantage in the construction previously known from practice without the present invention is that the deploying airbag 103 must cover a path up to the airbag seam 101. This costs safety-related time. In addition, the airbag 103 simultaneously deploys downward and upward, as shown, and is braked in its forward deployment above and below the collar 104. Without the point-by-point tears, the airbag has difficulty tearing the airbag seam 101 above and below the collar 104. Another disadvantage in the previously known construction is the seam opening simultaneously with the airbag discharge directly on the head of an OOP child (out of position).

A solution without the listed disadvantages is produced by the measures shown in FIGS. 33-36. As shown in FIG. 33, the strip 99 with the integrated tear strips 100 is placed through a slit 106 such that the not-yet deployed airbag 103 is already surrounded with the loop 105 of the collar 104. Passing the strip 99 through is shown schematically in FIG. 34. FIG. 35 shows one of the "final" collar parts 104 as they are cut. In FIG. 36 it is shown how the airbag already begins, at the beginning of its most forceful deployment in this stage, to pull out the tear strips 100 and thus tears holes point by point in the airbag seam 101. When the airbag 103 contacts the airbag seam 101, the seam is already open up to the fabric run sections that provide, according to experience, no significant resistance. This is a positive effect for the deployment speed of the airbag 103 and the injury numbers of the OOP child (not shown). According to experience, the airbag 103 deploys essentially upward and downward, while it passes through the torn hole in the airbag seam 101. Here, it further "peels" the opening of the airbag seam 101 larger according to the laws of fabric runs, which is a significantly easier process than pressing from the inside at an obtuse angle against the still closed airbag seam 101.

The opening technique described at the end produced, for modern initial conditions, an opening power of the airbag 103 that was less by a factor of 8 (!!!). Therefore it is meaningful not to weaken the airbag seam 101 and to always still have a tolerance of all of the strength effects of the airbag tearing seam of 400%. 100% reduction could be used for a "double lap seam," because in this configuration, the tear strips 100 are sewn "double."

Figure 37:
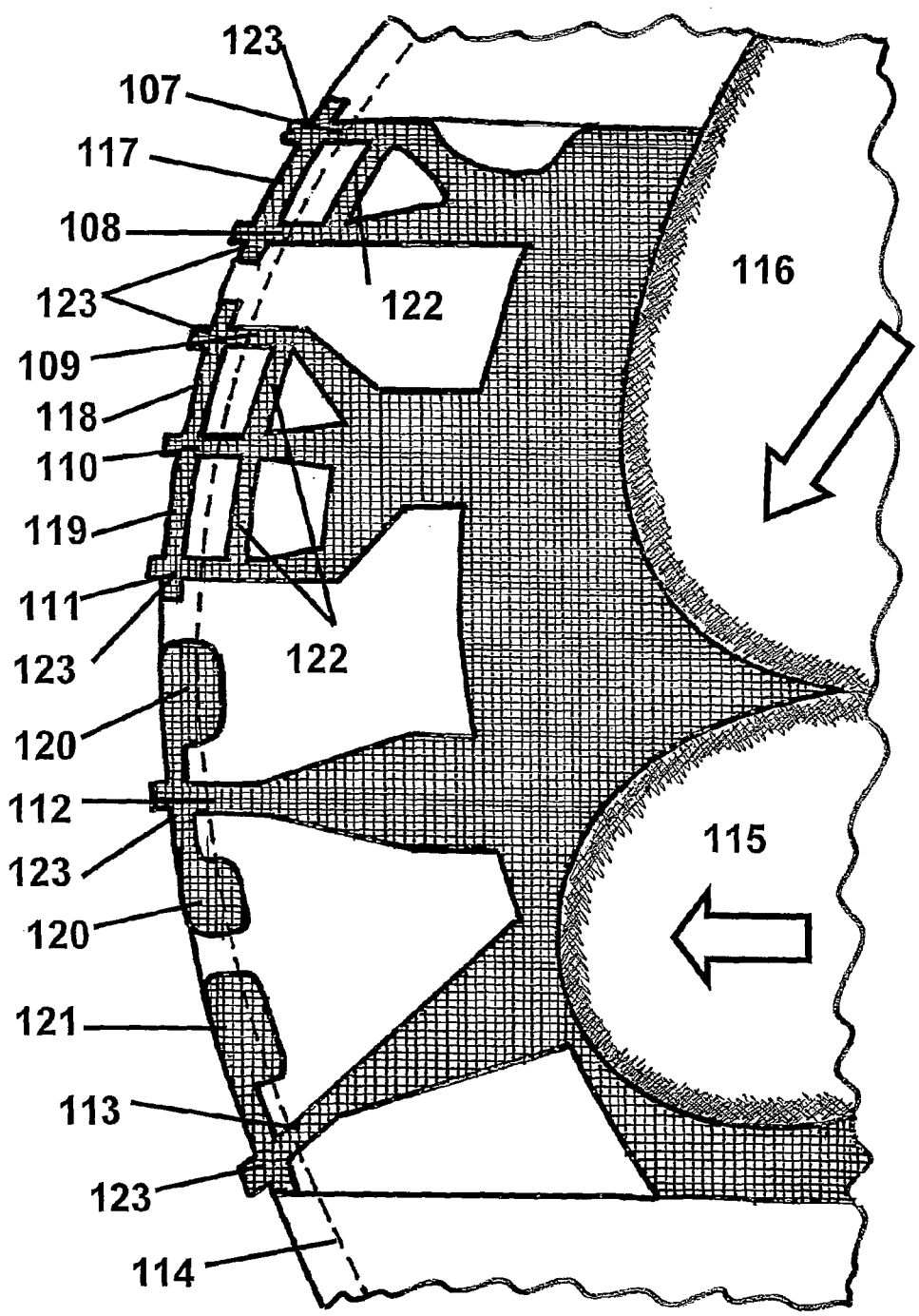
FIG. 37 shows a schematic side view diagram of a twelfth embodiment.

In FIG. 37, an alternative change to the tear strips 107-113 is shown, in order to optimize and to control in certain limits the deployment behavior of the airbag. For this purpose, the tear strips 107-113 have different designs. The tear strips 108, 110, 112, 113 optimally quickly tear fabric runs in the tearing seam 114 as phase 1. As phase 2, the tear strips 107, 109, and 111 are then stretched in their length and then first tear "their" fabric runs in the airbag tearing seam 114. This measure distributes the opening force of the airbag 115 and 116 in time and thus halves the peak force for opening the airbag tearing seam 114. In a phase 3, larger passage holes are then torn in the airbag tearing seam 114. For this purpose, connecting pieces 117-119 are alternatively formed between the tear strips 107-119. If the connecting pieces 117-119 are left out, then there are only fabric run holes, which, as an example, somewhat brakes the upper airbag. On the tear strips 112 and 113, alternatively one-side or two-sided flaps 120 or 121 are formed that tear holes beginning from the fabric run (not shown). Due to the tearing seam 114 opened before the airbag passage, the airbag 115 and 116 moves less aggressively forward and the specified position of the hole controls the direction of the deployment of the bag in certain limits, which is very important for the lower airbag 115 for achieving a balance between a protective effect and injuries due to incorrect positioning of children, which is regulated exactly in OOP (out of position) rules and regulations. The intermediate connecting pieces 122 are formed only to reduce the hole between the tear strips, in order to avoid "obstruction" of the airbag 116 therein. At the end points 123 of the tear strips 107-113, these are each lengthened in a cross shape, so that in this way the threads do not tear out when the tear strips tear. Thus, the comb shearing strength is improved.

Figure 38:
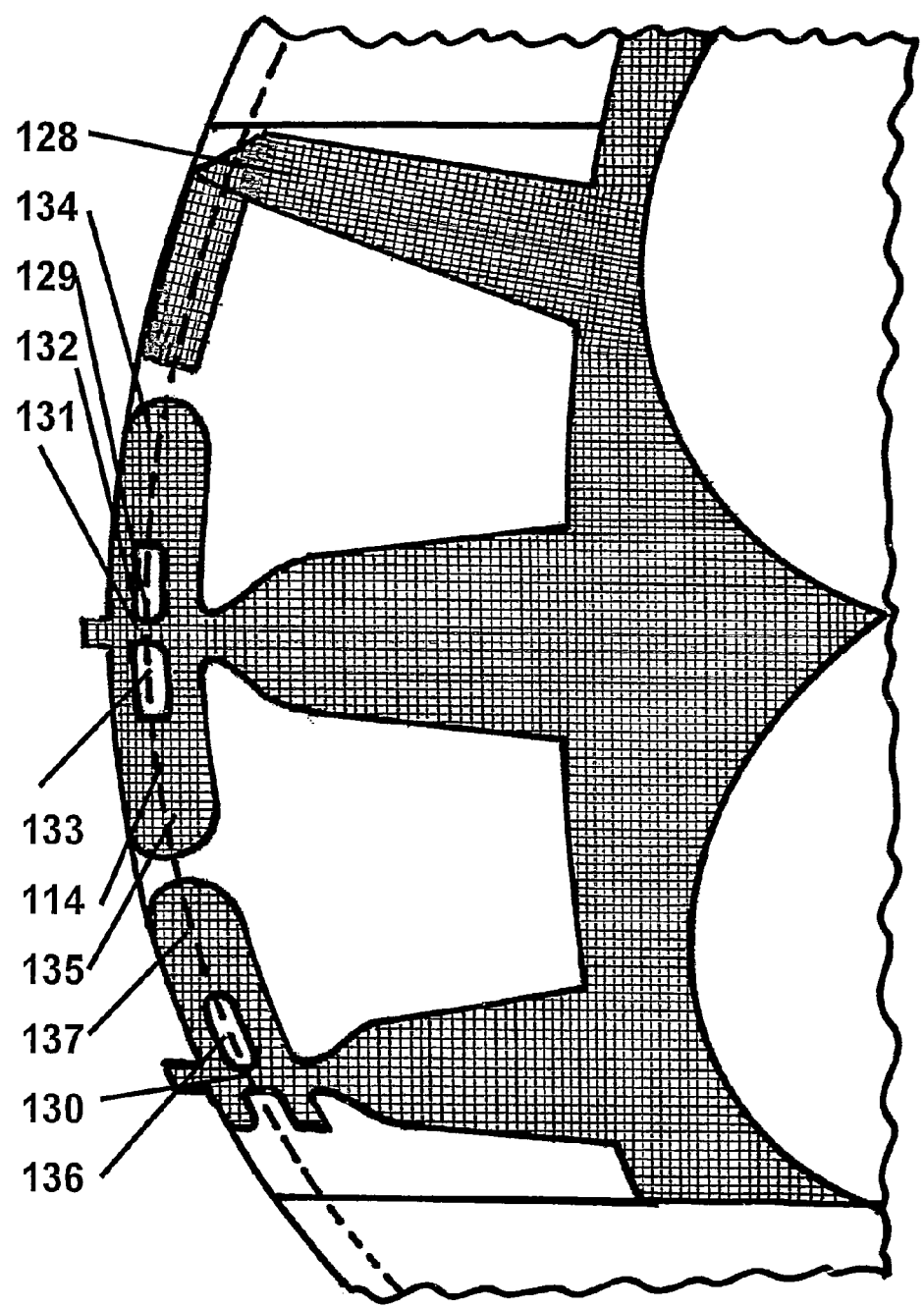
FIG. 38 shows a schematic side view diagram of a thirteenth embodiment.

FIG. 38 shows another alternative construction of the tear strips 128-130. The advantage of this measure is that, during the crash, larger holes are "peeled" and thus the passage of the airbag 127 is made easier. For this purpose, the tear strip 128 is tilted back at approximately a right angle and fixed in this position at the edge by hot welding as a preassembly for the one-piece use of the multiple tear strips for sewing. In the tear strips 129, in the first phase of the pulling, a connecting piece 131 is torn out from the tearing seam 114. The two holes 132 and 133 release the necessary travel. In the next phase, tabs 134 and 135 peel two large holes in the tearing seam 114. In the tear strip 130, the previously mentioned tearing mechanism is realized as shown toward one side. Other constructions with the same physical background were tested and represent other alternatives.

FIGS. 39 and 40 show, as a summary, schematically in section the effect of a current collar 124 on the airbag deployment. FIG. 39 shows the rest state, how the current collar 124 is placed around the airbag module 125 and is sewn in two extra parts itself and with the airbag seam 114 on the seat cover 126. FIG. 40 shows that, in the event of a crash, the airbag 127 deploys straight ahead in the direction opposite the tearing seam 114 and opposite the head of the OOP child (out of position) and the tearing seam 114 opens directly on the head.

FIGS. 41 and 42 show, as a summary, schematically in section the effect of the tear strips 107-113 on OOP (out of position). The tear strips 124 assembled as a collar are shown in the rest position in FIG. 41. When the airbag 127 deploys, by means of the tear strips 107-113, the airbag tearing seam is pulled back by the "direction change" through the slits in the lower part of the tear-strip collar and thus opens in the opposite direction to the deployment of the airbag 127. The risk of injury for OOP is lower, because the airbag 127 can emerge "softly" through the pre-opened seam.

Another task in the airbag modules is achieving a smaller overall height and a screw-free assembly from the "outside" for cost savings. Modern modules have a tubular sleeve made from sheet metal around the gas discharge holes of the generator, so that the airbag fabric does not burn. The fastening of the module is typically performed separately with threaded bolts. The present invention features two examples in one especially also independently inventive aspect for how the fastening of the module is produced as an integral component of the heat shield.

Figure 43:
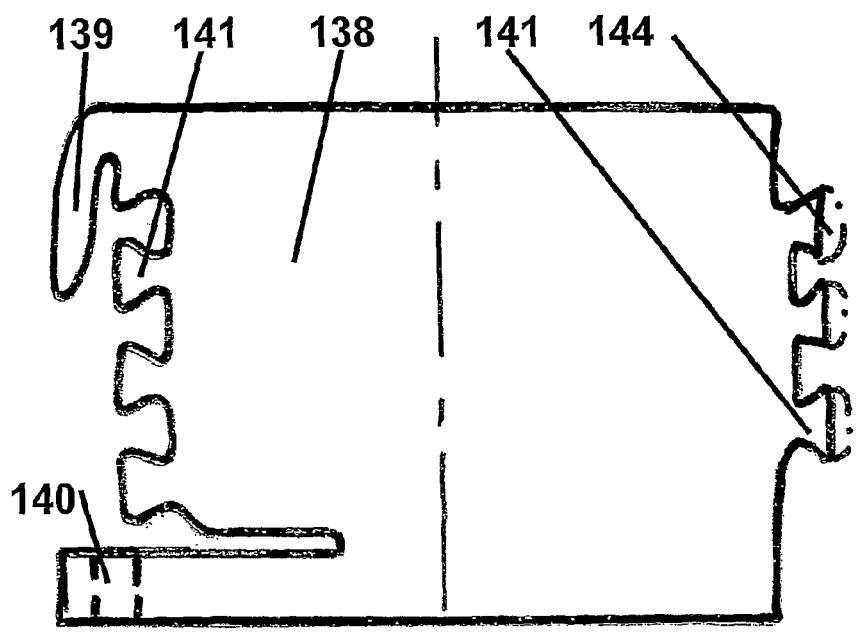
FIG. 43 shows, in a schematic plan view, a detail of a manufacturing variant for an airbag module.
Figure 44:
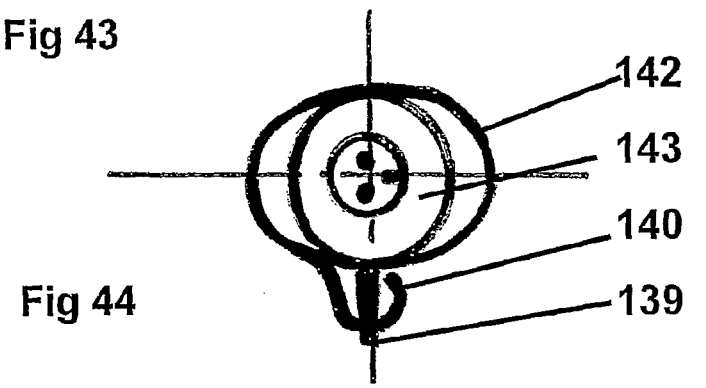
FIG. 44 shows, in a schematic section view, another detail of the manufacturing variant for an airbag module according to FIG. 43.

FIG. 43 shows a correspondingly stamped sheet-metal blank 138. In the sheet-metal blank 138, a hook 139 and a clip 140 are integrated. They are angled in a second step according to the purpose. Furthermore, on both sides a bend 141 is formed that produces a mechanical connection when shaped into a tube 142. In order to achieve smaller overall heights, the tube 142 is pressed into an oval as shown in FIG. 44. A laser weld beam connects the two tube halves 122 to each other and to a generator 143. For optimal welding, the bend 141 is provided with recesses 144, so that in one processing step, the tube can be welded to itself and to the generator. This assembly is placed with the hook and the clip through slits in the airbag fabric that are advantageously cut alternatively with hot blade pincers (not shown). The airbag module 125 is then pushed with the hook 139 into a slit in the seat backrest and then pivoted into the fastening hole in the backrest (not shown). If the clipping has not been performed correctly, then the module extends outward at an angle from the surface of the seat cover.

Figure 45:
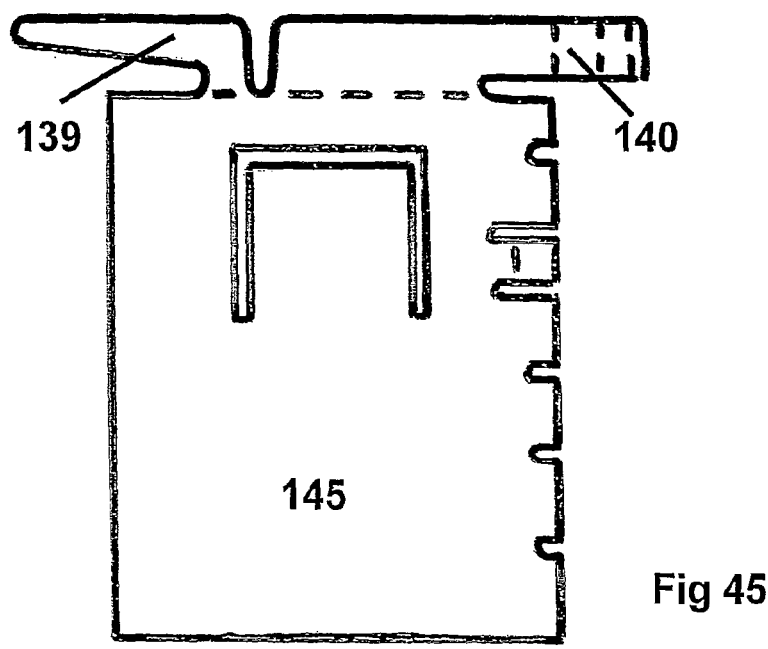
FIG. 45 shows, in a schematic plan view, a detail of another manufacturing variant for an airbag module.
Figures 46, 47:
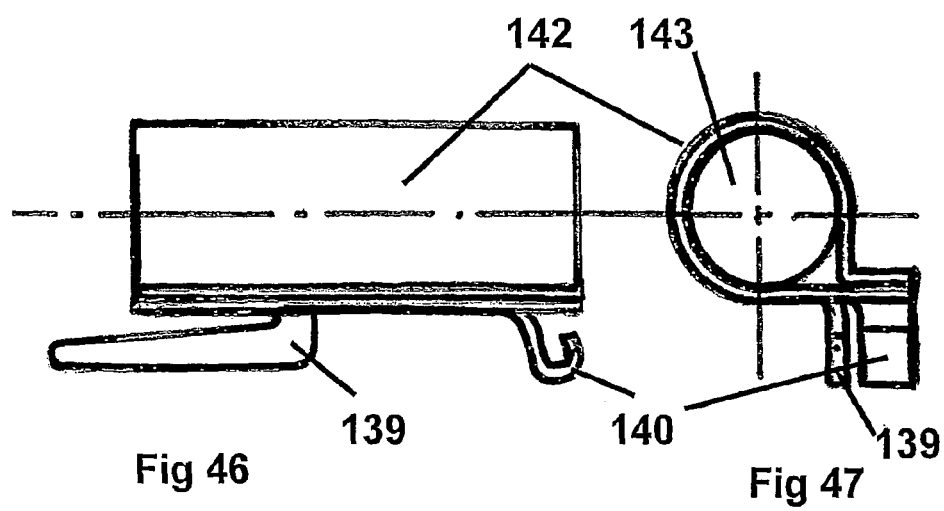
FIG. 46 shows, in a schematic side view, the detail of the other manufacturing variant for an airbag module according to FIG. 45.
FIG. 47 shows, in a schematic section view, another detail of the manufacturing variant for an airbag module according to FIGS. 45 and 46.

FIGS. 45-47 show, as another example, a version of the hook/clip integration in which a modern version forms the basis in which the two screw bolts were replaced by hook 139 and clip 140. FIG. 45 shows the correspondingly changed sheet-metal blank; FIG. 46 shows the assembly from the side; and FIG. 47 shows the assembly from the axial direction. Alternatively, the clip 140 could also be replaced by a separate expansion bolt, a separate "sheet clamping clip" or the like. This requires a larger sheet-metal blank and more handles.

The invention is illustrated merely as examples with reference to the embodiments in the description and in the drawing and is not limited to these embodiments, but instead comprises all variations, modifications, substitutions, and combinations that someone skilled in the art infers from the present documents especially in the scope of the claims and the general descriptions in the introduction of this description, as well as the description of the embodiments and their illustrations in the drawing, and can combine with his expert knowledge, as well as the prior art, especially the disclosure contents of the individual prior publications specified above. In particular, all of the individual features and possible constructions of the invention and their construction variants can be combined.

REFERENCE SYMBOLS

1 Seat foam
2 Backrest
3 Airbag
4 Generator
13 Tear strips
14 Fabric web
15 Holes
16 Weld points
17 Pocket
18 Airbag module
19 Airbag seam
20 Seat cover
21 Openings
22 Barcode
23 Cover
24 Plate
25 Vacuum
26 Flap
27 Hinge
28 Plate
29 Holes
30 Pins
31 Assembly seam
32 Fabric parts
33 Holes
34 Cutout
35 Foam cover
36 Crease
37 Wide strip
38 Slits 39 Hot pins
40 Tearing collar
41 Base plate
42 Strip
43 Bolt
44 Bolt
45 Holding die
46 Lower slide plate
47 Vertical slide
48 Upper slide plate
49 Feet
50 Base plate
51 Guide bars
52 Air cylinder
53 Hot pins
54 Airbag collar
55 Tear strips
56 Tear-strip collar
57 Textile
58 Warp threads
59 Woof threads
60 Holes
61 Holes
62 Assembly
63 Narrow tear strips
64 Loop
65 Formed sheets
66 Transverse connection
67 Welding
68 Tear strip
69 Airbag label
70 Airbag discharge seam
71 Tear strip collar
72 Pre-cut part
73 Marker
74 Positioning holes
75 Viewing hole
76 Bolt
77 Plate
78 Slide plate
79 Slits
80 Textile ends
81 Slit
82 Finger
83 Wide tear strips
84 Narrow tear strips
85 Hot blade
86 Edge threads
87 Slit
88 Counter support
89 Mounting hole
90 Mounting hole
91 Mounting hole
92 Mounting hole
93 Cover
94 Seat foam 95 Clip [sic]
95 Clip
96 Soft-cover airbag module
97 Film hinge
98 Piece
99 Strip
100 Tear strips
101 Airbag seam/tearing seam
102 Stitch
103 Airbag
104 Collar
105 Loop
106 Slit
107 Tear strip
108 Tear strip
109 Tear strip
110 Tear strip
111 Tear strip
113 Tear strip
113 Tear strip
114 Tearing seam
115 Airbag
116 Airbag
117 Connecting piece
118 Connecting piece
119 Connecting piece
120 Tab
121 Tab
122 Intermediate connecting piece
123 End piece
124 Collar
125 Airbag module
126 Seat cover 127 Airbag
128 Tear strip
129 Tear strip
130 Tear strip
131 Connecting piece
132 Hole
133 Hole
134 Tab
135 Tab
136 Hole
137 Tab
138 Sheet-metal blank
139 Hook
140 Clip
141 Claw mechanism
142 Tube
143 Generator
144 Recess
145 Sheet-metal blank
A Airbag module
G Housing
S Seat

The invention claimed is:

1. An airbag module deployment device for an airbag deployable from under a seat cover having a stitched seam having a length, the device comprising:
a collar positionable about the airbag, the collar including a plurality of tear strips each having a first end extending from the collar, and a second end opposite the first end sewn into the stitched seam to intersect a partial portion of the stitched seam, the plurality of tear strips thereby intersecting the stitched seam at a plurality of separated locations along the length of the stitched seam, the plurality of tear strips thereby operative to tear the seat cover stitched seam at a plurality of separate locations along the length of the stitched seam when the airbag is deploying, thereby weakening the stitched seam to admit passage of the airbag past the seat cover.

2. The device of claim 1, wherein a first tearing force is required for tearing the intersected stitches, and a second force is required for tearing lengths of stitches of the stitched seam extending between intersected stitches, and the relative balance of the first and second forces is predetermined.

3. The device of claim 1, wherein a plurality of tear strips extend from a relatively wider strip extending from the collar.

4. The device of claim 3, wherein the relatively wider strips pass through spaces in the collar, in an interlacing manner.

5. The device of claim 1, wherein warp threads and woof threads of the collar and tear strips are oriented at an angle with respect to a pulling direction of the tear strips, to reduce an incidence of tearing of the collar and tear strip material.

6. The device of claim 5, wherein tear strips are respectively substantially parallel.

7. The device of claim 1, wherein at least one of the plurality of tear strips includes the indicia AIRBAG at an end.

8. The device of claim 1, wherein the collar including positioning holes therethrough, the positioning holes positionable over positioning pins to orient the collar for a hot cutting process.

9. The device of claim 1, wherein the collar orienting by a positioning vane for sewing.

10. The device of claim 1, wherein the tear strips are maintained in a position for sewing with one or more weld points.

11. The device of claim 10, wherein the collar is positioned for forming the one or more weld points with a holder.

12. The device of claim 1, wherein an opening in foam of a seat backrest covered by the seat cover for holding the airbag module is configured whereby a case cover of the airbag module is aligned with respect to a surface of the seat cover.

13. The device of claim 1, wherein a portion of an expansion energy of the airbag deployment is distributed to the intersected stitches seam and is thus not available for tearing of stitches extending between intersected stitches.

14. The device of claim 1, wherein an energy of the airbag deployment is distributed in a predetermined sequence between tearing the intersected stitches and the stitched seam.

15. The device of claim 1, wherein the collar is configured such that an expansion energy of the airbag deployment is distributed between tearing by the tear strips to movement of an airbag module cover.

16. The device of claim 1, wherein tear strips are passed through slits formed in the collar.

17. The device of claim 1, wherein tear strips apply a tearing effect according to a predetermined sequence along the stitched seam in relation to passage of the tear strips through slits formed in the collar.

18. The device of claim 1, wherein the tear strips tear the stitched seam in a direction transverse to a length of the stitched seam in relation to a direction through which the tear strips pass through slits formed in the collar.

19. The device of claim 1, wherein in a first phase, the tear strips form holes in a plurality of locations along a length of the stitched seam.

20. The device of claim 19, wherein in a second phase, the stitched seam is torn between the formed holes to admit passage of the airbag.

21. The device of claim 20, wherein the tear strips include lateral tabs sewn into the stitched seam for tearing between formed holes in the second phase.

22. The device of claim 21, wherein tabs are connected to a plurality of locations along a length of a tear strip.

23. The device of claim 19, wherein tear strips tear the stitched seam sequentially to reduce load peaks resisting expansion of the airbag.

24. The device of claim 19, wherein warp threads and woof threads of intersecting portions of the tear strips and collar are oriented with respect to each other to prevent tearing of the collar or tear strips.

25. The device of claim 1, wherein tear strips are connected to the stitched seam with a predetermined extent of slack, whereby a full force of the deploying airbag is absorbed by the tear strips at an early stage in inflation of the air bag.

26. The device of claim 25, wherein the tear strips are configured to tear the stitched seam at an early stage of airbag deployment to improve out of position values.

27. The device of claim 1, wherein the collar is configured to enable the airbag module to be inserted and clipped for mounting.

28. An assembly method for an airbag module, comprising:
mounting an airbag module in accordance with claim 1 under the seat cover.

29. The method of claim 28, further including cutting material of the collar with a hot blade to form tear strips, such that cut ends of the tear strips fuse thereby reducing an incidence of tearing of collar material at the end of said tear strips.

30. The method of claim 28, further including holding a plurality of tear strips in relative spaced orientation for sewing to the stitched seam.

31. The method of claim 28, further including forming tear strips by a hot-cutting process to fuse material at the end of each tear strip whereby threads joining a tear strip and the stitched seam are not torn out under loading.

32. The method of claim 28, further including forming the tear strips to fall, without a requirement for individual orientation, into a holder configured to finally orient the tear strips for assembly.

33. the method of claim 28, further including orienting a plurality of tear strips upon a combed plate configured to simultaneously push the oriented tear strips through slits formed in the collar.

34. The device of claim 1, wherein a tear-strip width is about 6 mm and a length of stitching between the tear strip end and the stitched seam is about 4 mm to 5 mm.

35. The device of claim 1, wherein one or more tear strips each pass through an opening in the collar in an interlacing manner.

36. The device of claim 1, wherein one or more tear strips each pass through an opening in the collar in an interlacing manner, the collar configured to expand when the airbag is deploying to thereby draw interlaced tear strips through their respective openings, the expansion forming leverage to increase a tearing force of the one or more passed tear strips.

37. The device of claim 1, wherein the collar is configured to expand when the airbag is deploying to leverage tear strips in a direction away from the stitched seam, the leverage increasing a tearing force of the tear strips.

38. The device of claim 37, wherein the expansion of the collar is along a direction transverse to an axis defined by the length of the stitched seam.

39. The device of claim 1, wherein the collar is configured to expand when the airbag is deploying to form a pulley effect for leveraging tear strips in a direction away from the stitched seam, the leverage increasing a tearing force of the tear strips.

40. The device of claim 1, wherein the first ends of tear strips are sewn to one to two stitches of the stitched seam.

41. The device of claim 1, wherein the first ends of tear strips are sewn to one to three stitches of the stitched seam.

42. An airbag module deployment device for an airbag deployable from under a seat cover having a stitched seam having a length, the device comprising:
a collar positionable about the airbag, the collar including
a plurality of tear strips each having a first end extending from the collar, and a second end opposite the first end connectable to the stitched seam to intersect the stitched seam at an angle to an axis defined by the length of the stitched seam, the plurality of tear strips thereby intersecting and connectable to the stitched seam at a plurality of separated locations along the length of the stitched seam, the plurality of tear strips thereby operative to tear the stitched seam to form a plurality of successive holes in the stitched seam when the airbag is deployed;

a plurality of slits formed in the collar, a plurality of tear strips each passable through one of the plurality of slits in a first direction before a connection is made to the stitched seam, the collar thereby forming a pulley effect to leverage tear strips in a second direction opposite to the first direction when the airbag is deployed and expanded, to thereby pull the tear strips to form the holes in the stitched seam, thereby weakening the stitched seam to admit passage of the airbag past the seat cover when the expanding airbag tears the stitched seam between the successive holes.

43. The device of claim 42, wherein the tear strips are connected to the stitched seam by stitches.

* * * * *

UNITED STATES PATENT AND TRADEMARK OFFICE
CERTIFICATE OF CORRECTION

PATENT NO. : 8,523,221 B2  Page 1 of 1
APPLICATION NO. : 13/003827
DATED : September 3, 2013
INVENTOR(S) : Helmut Müller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

Signed and Sealed this

Fifteenth Day of September, 2015

Michelle K. Lee
*Director of the United States Patent and Trademark Office*